(12) United States Patent
Magana Perdomo et al.

(10) Patent No.: US 11,797,351 B2
(45) Date of Patent: Oct. 24, 2023

(54) HIGH-AVAILABILITY CONTINUOUS DELIVERY OF DATACENTER BUILDS ON CLOUD COMPUTING PLATFORMS

(71) Applicant: salesforce.com, inc., San Francisco, CA (US)

(72) Inventors: Edgar Francisco Magana Perdomo, Danville, CA (US); Charles M. Lane, II, Mooresville, IN (US)

(73) Assignee: Salesforce, Inc., San Francisco, CA (US)

( * ) Notice: Subject to any disclaimer, the term of this patent is extended or adjusted under 35 U.S.C. 154(b) by 177 days.

(21) Appl. No.: 17/243,294

(22) Filed: Apr. 28, 2021

(65) Prior Publication Data

US 2022/0350670 A1 Nov. 3, 2022

(51) Int. Cl.
*G06F 11/14* (2006.01)
*G06F 9/50* (2006.01)
(Continued)

(52) U.S. Cl.
CPC .......... *G06F 9/5072* (2013.01); *G06F 9/3836* (2013.01); *G06F 11/1425* (2013.01); *G06F 11/2092* (2013.01)

(58) Field of Classification Search
CPC .. G06F 9/5072; G06F 9/3836; G06F 11/1425; G06F 11/2092
See application file for complete search history.

(56) References Cited

U.S. PATENT DOCUMENTS 4,347,563 A * 8/1982 Paredes ............... G06F 11/2023
700/8
10,671,493 B1 * 6/2020 Bissmeyer .......... G06F 11/1464
(Continued)

FOREIGN PATENT DOCUMENTS

WO WO-2019112704 A1 * 6/2019 ......... H04L 12/1435
WO WO-2022165269 A1 * 8/2022 ............ H04L 67/02

OTHER PUBLICATIONS

Burns, E., "Why Spinnaker matters to CI/CD," Aug. 27, 2019, ten pages, [Online] [Retrieved on Jun. 25, 2021] Retrieved from the Internet <URL: https://opensource.com/article/19/8/why-spinnaker-matters-cicd>.

(Continued)

*Primary Examiner* — Matthew M Kim
*Assistant Examiner* — Indranil Chowdhury
(74) *Attorney, Agent, or Firm* — Fenwick & West LLP

(57) ABSTRACT

Computing systems, for example, multi-tenant systems deploy software artifacts in data centers created in a cloud platform using a cloud platform infrastructure language that is cloud platform independent. The system uses a control datacenter with a set of service groups used for configuring other datacenters, for example, for performing continuous delivery of software artifacts for other datacenters. The system configures on the cloud platform: (1) a primary control datacenter, (2) a secondary control datacenter, and (3) a tertiary control datacenter. Each control datacenter is configured to act as one or more of: (a) an active control datacenter for configuring cloud infrastructure on tenant datacenters, wherein a tenant datacenter is associated with a tenant of a multi-tenant system, (b) a standby control datacenter for taking over as the active control datacenter, or (c) a recovery control datacenter for fixing components of another control datacenter.

20 Claims, 26 Drawing Sheets

(51) Int. Cl.
  *G06F 9/38* (2018.01)
  *G06F 11/20* (2006.01)

(56) References Cited

U.S. PATENT DOCUMENTS

| | | | |
|---|---|---|---|
| 11,561,868 B1* | 1/2023 | Poornachandran | ........................ G06F 11/2028 |
| 2013/0179574 A1* | 7/2013 | Calder | .................. G06F 9/5033 709/226 |
| 2014/0165121 A1* | 6/2014 | Dang | ................ H04N 21/2407 725/109 |
| 2016/0188427 A1* | 6/2016 | Chandrashekar | ... H04L 67/1097 714/4.11 |
| 2017/0093615 A1* | 3/2017 | Chandrashekar | ... G06F 11/2038 |
| 2017/0180459 A1* | 6/2017 | Frank | .................. H04L 41/0866 |
| 2018/0060894 A1* | 3/2018 | Beveridge | .......... G06Q 30/0206 |
| 2018/0247654 A1* | 8/2018 | Bhaya | .................. G06F 40/205 |
| 2019/0138342 A1* | 5/2019 | Dornemann | ........ G06F 11/2097 |
| 2019/0306185 A1* | 10/2019 | Katrekar | ............. H04L 41/0866 |
| 2020/0127937 A1* | 4/2020 | Busick | ................ H04L 41/5096 |
| 2020/0150733 A1* | 5/2020 | Gutierrez | .................. G06F 1/28 |
| 2020/0183802 A1* | 6/2020 | Rathi | .................. G06F 11/2094 |
| 2021/0111942 A1* | 4/2021 | Tahhan | ............... H04L 41/0695 |
| 2021/0266242 A1* | 8/2021 | Kaliyamoorthy | ... H04L 43/0876 |
| 2022/0179629 A1* | 6/2022 | Kiselev | ..................... G06F 8/61 |
| 2022/0188218 A1* | 6/2022 | Abrams | ................ G06F 11/368 |
| 2022/0239736 A1* | 7/2022 | Magana Perdomo | ....................... H04L 67/306 |
| 2022/0353325 A1* | 11/2022 | Dai | ...................... H04L 67/1034 |
| 2022/0353326 A1* | 11/2022 | Yang | ..................... H04L 67/568 |
| 2022/0374316 A1* | 11/2022 | Kumar | ................ G06F 16/1824 |
| 2023/0168872 A1* | 6/2023 | Hang | ....................... G06F 8/34 715/762 |
| 2023/0171244 A1* | 6/2023 | Peddada | ............. H04L 63/0807 726/7 |
| 2023/0171323 A1* | 6/2023 | Peddada | ................ H04L 67/34 709/217 |

OTHER PUBLICATIONS

Mukherjee, J., "Continuous delivery pipeline 101: What is a continuous delivery pipeline?," Date Unknown, 14 pages, [Online] [Retrieved on Jun. 25, 2021] Retrieved from the Internet <URL: https://www.atlassian.com/continuous-delivery/pipeline>.

Thakur, V., "Continuous Delivery Pipeline for Kubernetes Using Spinnaker," May 27, 2020, 21 pages, [Online] [Retrieved on Jun. 25, 2021] Retrieved from the Internet <URL: https://www.metricfire.com/blog/continuous-delivery-pipeline-for-kubernetes-using-spinnaker/?GAID=undefined>.

* cited by examiner

1800

```
┌─────────────────────────────────────────┐
│ Receiving request to configure a tenant │
│       datacenter on the cloud platform  │
│                  1810                   │
└─────────────────────────────────────────┘
                    │
                    ▼
┌─────────────────────────────────────────┐
│ Configuring (1) the primary control     │
│ datacenter to act as active control     │
│ datacenter (2) the secondary control    │
│ datacenter to act as standby control    │
│ datacenter and (3) the tertiary control │
│ datacenter to act as recovery control   │
│ datacenter                              │
│                  1820                   │
└─────────────────────────────────────────┘
                    │
                    ▼
┌─────────────────────────────────────────┐
│ Receiving indication of interruption of │
│   service of the primary control        │
│            datacenter                   │
│                  1830                   │
└─────────────────────────────────────────┘
                    │
                    ▼
┌─────────────────────────────────────────┐
│ Reconfiguring the secondary control     │
│ datacenter to act as active control     │
│ datacenter and the tertiary control     │
│ datacenter to act as recovery and       │
│ standby control datacenters             │
│                  1840                   │
└─────────────────────────────────────────┘
                    │
                    ▼
┌─────────────────────────────────────────┐
│ Causing the tertiary control datacenter │
│   to fix components of the primary      │
│            control datacenter           │
│                  1850                   │
└─────────────────────────────────────────┘
```

FIG. 18

HIGH-AVAILABILITY CONTINUOUS DELIVERY OF DATACENTER BUILDS ON CLOUD COMPUTING PLATFORMS

BACKGROUND

Field of Art

This disclosure relates in general to continuous delivery of software releases in cloud computing platforms, and in particular to high availability of continuous delivery of datacenter builds on cloud computing platforms.

Description of Related Art

Organizations are increasingly replying on cloud platforms (also referred to as cloud computing platforms) such as AWS (AMAZON WEB SERVICES), GOOGLE cloud platform, MICROSOFT AZURE, and so on for their infrastructure needs. Cloud platforms provide servers, storage, databases, networking, software, and so on over the internet to organizations. Conventionally, organizations maintained data centers that house hardware and software used by the organization. However, maintaining data centers can result in significant overhead in terms of maintenance, personnel, and so on. As a result, organizations are shifting their data centers to cloud platforms that provide scalability and elasticity of computing resources.

Organizations maintain computing infrastructure on cloud platforms using continuous delivery platforms that can manage and deploy applications on cloud platforms. Such continuous delivery platforms allow organizations to simplify software deployment process and manage applications, firewalls, clusters, servers, load balancers, and other computing infrastructure on the cloud platform. However, deploying software releases for services provided on a cloud platform using a continuous delivery platform can be complex. For example, different versions of software may have to be deployed on different services running on different cloud computing resources. Furthermore, each cloud platform uses different tools for managing the resources.

A large system such as a multi-tenant system may manage services for a large number of organizations representing tenants of the multi-tenant system and may interact with multiple cloud platforms. Furthermore, maintaining services for multiple tenants requires enforcing boundaries across data and applications of different tenants in the cloud platform. The system maintaining services on the cloud platform needs to also ensure that any continuous delivery of new releases is performed without interruptions. A failure in the infrastructure used for performing continuous delivery of the software artifacts could limit the ability to manage all services running for all tenants if the system is a multi-tenant system. Such a failure would interrupt installations of new features as well as any fixes due to defects or failures of existing services. Conventional systems that do not handle such failures of infrastructure effectively may cause long interruptions of services. Conventional techniques for continuous delivery are suited to conventional datacenters that are managed and operated by a single organization. Continuous delivery on a public cloud environment involves several additional considerations such as possibility of unauthorized data access, shared resources, lack of direct control on computing resources by the organization, and so on. Conventional techniques for continuous delivery are inadequate for deploying software artifacts on public cloud environments.

BRIEF DESCRIPTION OF DRAWINGS

FIG. 18 shows the process for handling a failure in a primary control datacenter by the high availability architecture of FIG. 17 according to an embodiment.

Figure 1:
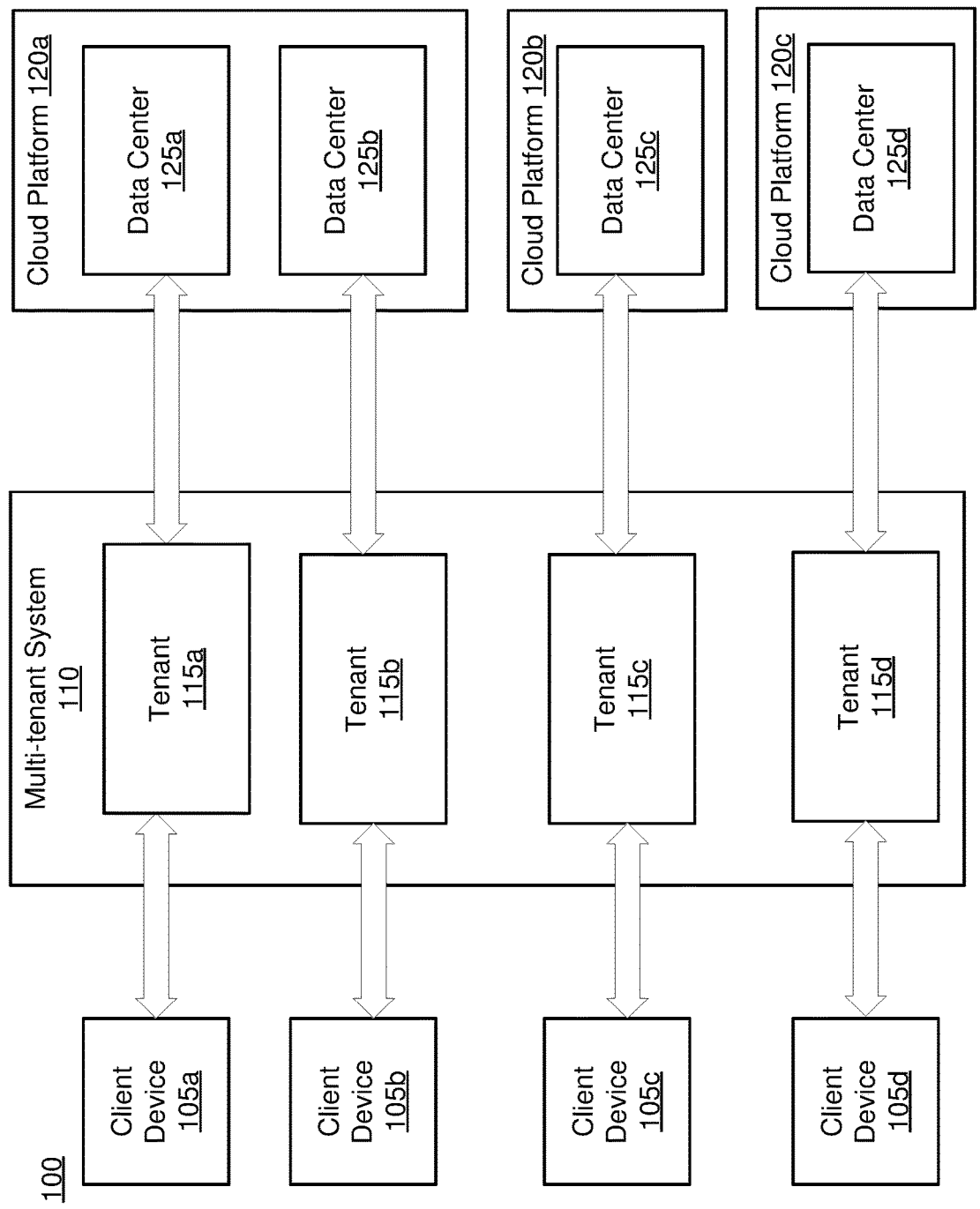
FIG. 1 is a block diagram of a system environment illustrating a multi-tenant system configuring data centers on cloud platforms according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

Cloud platforms provide computing resources, such as storage, computing resources, applications, and so on to computing systems on an on-demand basis via a public network such as internet. Cloud platforms allow enterprises to minimize upfront costs to set up computing infrastructure and also allow enterprises to get applications up and running faster with less maintenance overhead. Cloud platforms also allow enterprises to adjust computing resources to rapidly fluctuating and unpredictable demands. Enterprises can create a data center using a cloud platform for use by users of the enterprise. However, implementing a data center on each cloud platform requires expertise in the technology of the cloud platform.

Embodiments create data centers in a cloud platform using a cloud platform infrastructure language that is cloud platform independent. The system receives a cloud platform independent declarative specification of a data center. The declarative specification describes the structure of the data center and may not provide instructions specifying how to create the data center. The cloud platform independent declarative specification is configured to generate the data center on any of a plurality of cloud platforms and is specified using a cloud platform infrastructure language. The system receives information identifying a target cloud platform for creating the data center and compiles the cloud platform independent declarative specification to generate a cloud platform specific data center representation. The system sends the cloud platform specific data center representation and a set of instructions for execution on the target cloud platform. The target cloud platform executes the instructions to configure the data center using the platform specific data center representation. The system provides users with access to the computing resources of the data center configured by the cloud platform.

In one embodiment, the system performs operations related to software releases on datacenters configured on a cloud platform, for example, deploying software releases, provisioning resources, performing rollback of software releases, and so on. The system accesses a data center configured on a target cloud platform. The datacenter is generated based on a cloud platform independent declarative specification comprising a hierarchy of data center entities. Each data center entity comprises one or more of (1) a service or (2) one or more other data center entities.

In one embodiment, the system performs fault tolerant continuous delivery of datacenter builds on cloud platforms. The datacenter build may configure the datacenter, configure services or service groups within the datacenter, deploy software artifacts associated with services of the datacenter, and so on. The datacenter build may be associated with a set of changes, for example, code changes or configuration changes associated with a datacenter or services running on the datacenter. The datacenter is configured on a cloud platform. The system uses a control datacenter with a specific set of service groups used for configuring other datacenters, for example, tenant datacenters created for use by specific tenants. The control datacenter is also used for performing continuous delivery of software artifacts for the tenant datacenters. The system comprises a fault tolerant architecture for control datacenters. Accordingly, the system uses a primary control datacenter and a secondary control datacenter. Any requests related to continuous delivery of software artifacts are directed to the primary control datacenter. The primary control datacenter configures infrastructure of the tenant datacenter, for example, by configuring computing resources in the cloud platform for the tenant datacenter according to a declarative specification of the tenant datacenter. The primary control datacenter transmits information describing state of the infrastructure configured to the secondary control datacenter, the state indicating the infrastructure that has been configured so far for the tenant datacenter. The information describing state of the infrastructure configured allows the secondary control datacenter to efficiently resume control of the process of configuring the tenant datacenter at any point in time, for example, if there is a failure of the primary control datacenter. If the secondary control datacenter takes control of the process of configuring the tenant datacenter, the secondary control datacenter starts transferring information describing state of the infrastructure configured to the secondary control datacenter, thereby reversing the roles of the primary and secondary control datacenters.

In an embodiment, the system performs high availability continuous delivery for a cloud platform. The system configures on the cloud platform: (1) a primary control datacenter, (2) a secondary control datacenter, and (3) a tertiary control datacenter. Each control datacenter configured to act as one or more of: (a) an active control datacenter for configuring cloud infrastructure on tenant datacenters, wherein a tenant datacenter is associated with a tenant of a multi-tenant system, (b) a standby control datacenter for taking over as the active control datacenter, or (c) a recovery control datacenter for fixing components of another control datacenter. An active control datacenter periodically transmits current state of infrastructure of the tenant datacenter being configured to a standby control datacenter and the standby control datacenter is configured to receive the current state of infrastructure of the tenant datacenter from the active control datacenter and validate the current state of infrastructure of the tenant datacenter.

The system receives a request to configure a tenant datacenter on the cloud platform. The system configures the primary control datacenter to act as the active control datacenter, the secondary control datacenter to act as the standby control datacenter, and the tertiary control datacenter at act as the recovery control datacenter. The system receives an indication of interruption of service of the primary control datacenter caused by one or more components of the primary datacenter. Responsive to receiving the indication of interruption, system causes the secondary control datacenter to act as the active control datacenter and the tertiary control datacenter to act as both the recovery control datacenter and the standby control datacenter. The tertiary control datacenter executes instructions to fix the one or more components of the primary control datacenter.

In an embodiment, before the primary control datacenter is fixed, the system receives an indication of interruption of service of the secondary control datacenter caused by one or more components of the secondary control datacenter. Responsive to receiving indication of interruption of service of the secondary control datacenter, the system causes the tertiary control datacenter to act as the recovery control datacenter as well as the active control datacenter. The requests for configuring the infrastructure for the tenant datacenter are directed to the tertiary control datacenter. The tertiary control datacenter also executes instructions to fix the components of the secondary control datacenter.

A cloud platform is also referred to herein as a substrate. The declarative specification of data center is substrate independent or substrate agnostic. The system may represent a multi-tenant system but is not limited to multi-tenant systems and can be any online system or any computing system with network access to the cloud platform.

System Environment

FIG. 1 is a block diagram of a system environment illustrating a multi-tenant system configuring data centers on cloud platforms according to an embodiment. The system environment 100 comprises a multi-tenant system 110, one or more cloud platforms 120, and one or more client devices 105. In other embodiments, the system environment 100 may include more or fewer components.

The multi-tenant system 110 stores information of one or more tenants 115. Each tenant may be associated with an enterprise that represents a customer of the multi-tenant system 110. Each tenant may have multiple users that interact with the multi-tenant system via client devices 105.

A cloud platform may also be referred to as a cloud computing platform or a public cloud environment. A tenant may use the cloud platform infrastructure language to provide a declarative specification of a datacenter that is created on a target cloud platform 120 and to perform operations using the datacenter, for example, provision resources, perform software releases and so on. A tenant 115 may create one or more data centers on a cloud platform 120. A data center represents a set of computing resources including servers, applications, storage, memory, and so on that can be used by users, for example, users associated with the tenant. Each tenant may offer different functionality to users of the tenant. Accordingly, each tenant may execute different services on the datacenter configured for the tenant. The multi-tenant system may implement different mechanisms for release and deployment of software for each tenant. A tenant may further obtain or develop versions of software that include instructions for various services executing in a datacenter. Embodiments allow the tenant to deploy specific versions of software releases for different services running on different computing resources of the datacenter.

The computing resources of a data center are secure and may not be accessed by users that are not authorized to access them. For example, a data center 125a that is created for users of tenant 115a may not be accessed by users of tenant 115b unless access is explicitly granted. Similarly, data center 125b that is created for users of tenant 115b may not be accessed by users of tenant 115a, unless access is explicitly granted. Furthermore, services provided by a data center may be accessed by computing systems outside the data center, only if access is granted to the computing systems in accordance with the declarative specification of the data center. The system uses multiple security layers to identify and authorize users to access these resources.

With the multi-tenant system 110, data for multiple tenants may be stored in the same physical database. However, the database is configured so that data of one tenant is kept logically separate from that of other tenants so that one tenant does not have access to another tenant's data, unless such data is expressly shared. It is transparent to tenants that their data may be stored in a table that is shared with data of other customers. A database table may store rows for a plurality of tenants. Accordingly, in a multi-tenant system, various elements of hardware and software of the system may be shared by one or more tenants. For example, the multi-tenant system 110 may execute an application server that simultaneously processes requests for a number of tenants. However, the multi-tenant system enforces tenant-level data isolation to ensure that jobs of one tenant do not access data of other tenants.

Examples of cloud platforms include AWS (AMAZON web services), GOOGLE cloud platform, or MICROSOFT AZURE. A cloud platform 120 offers computing infrastructure services that may be used on demand by a tenant 115 or by any computing system external to the cloud platform 120. Examples of the computing infrastructure services offered by a cloud platform include servers, storage, databases, networking, security, load balancing, software, analytics, intelligence, and other infrastructure service functionalities. These infrastructure services may be used by a tenant 115 to build, deploy, and manage applications in a scalable and secure manner.

The multi-tenant system 110 may include a tenant data store that stores data for various tenants of the multi-tenant store. The tenant data store may store data for different tenants in separate physical structures, for example, separate database tables or separate databases. Alternatively, the tenant data store may store data of multiple tenants in a shared structure. For example, user accounts for all tenants may share the same database table. However, the multi-tenant system stores additional information to logically separate data of different tenants.

Each component shown in FIG. 1 represents one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions.

The interactions between the various components of the system environment 100 are typically performed via a network, not shown in FIG. 1. In one embodiment, the network uses standard communications technologies and/or protocols. In another embodiment, the entities can use custom and/or dedicated data communications technologies instead of, or in addition to, the ones described above.

Although the techniques disclosed herein are described in the context of a multi-tenant system, the techniques can be implemented using other systems that may not be multi-tenant systems. For example, an online system used by a single organization or enterprise may use the techniques disclosed herein to create one or more data centers on one or more cloud platforms 120.

System Architecture

Figure 2A:
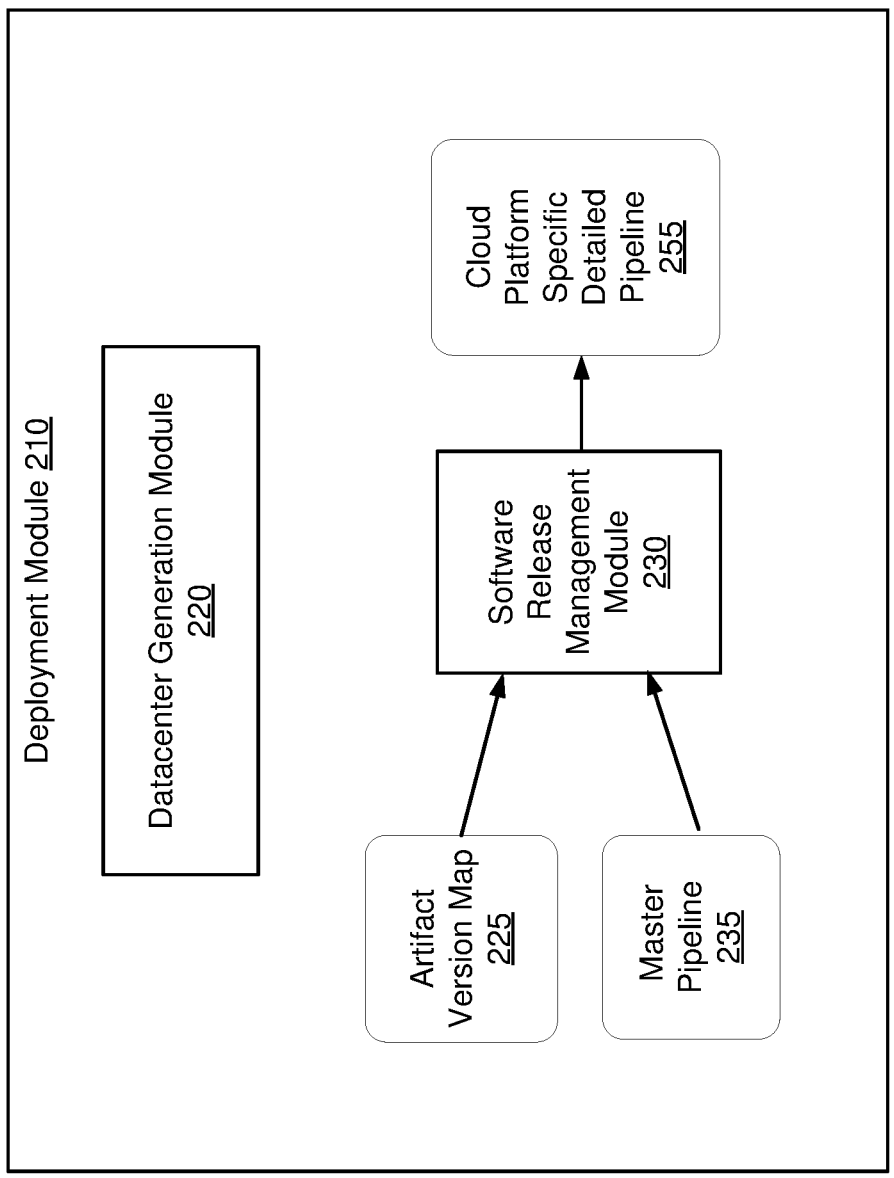
FIG. 2A is a block diagram illustrating the system architecture of a deployment module 210 according to an embodiment.

The multi-tenant system 110 includes a deployment module for deploying software artifacts on the cloud platforms. The deployment module can perform various operations associated with software releases, for example, provisioning resources on a cloud platform, deploying software releases, performing rollbacks of software artifacts installed on datacenter entities, and so on. FIG. 2 is a block diagram illustrating the system architecture of a deployment module 210 according to an embodiment. The deployment module 210 includes a data center generation module 220 and a software release management module 230. Other embodiments can have different and/or other components than the ones described here, and that the functionalities can be distributed among the components in a different manner.

The data center generation module 220 includes instructions for creating datacenters on the cloud platform. The software release management module 230 includes instructions for deploying software releases for various services or applications running on the datacenters created by the data center generation module 220.

Figure 4:
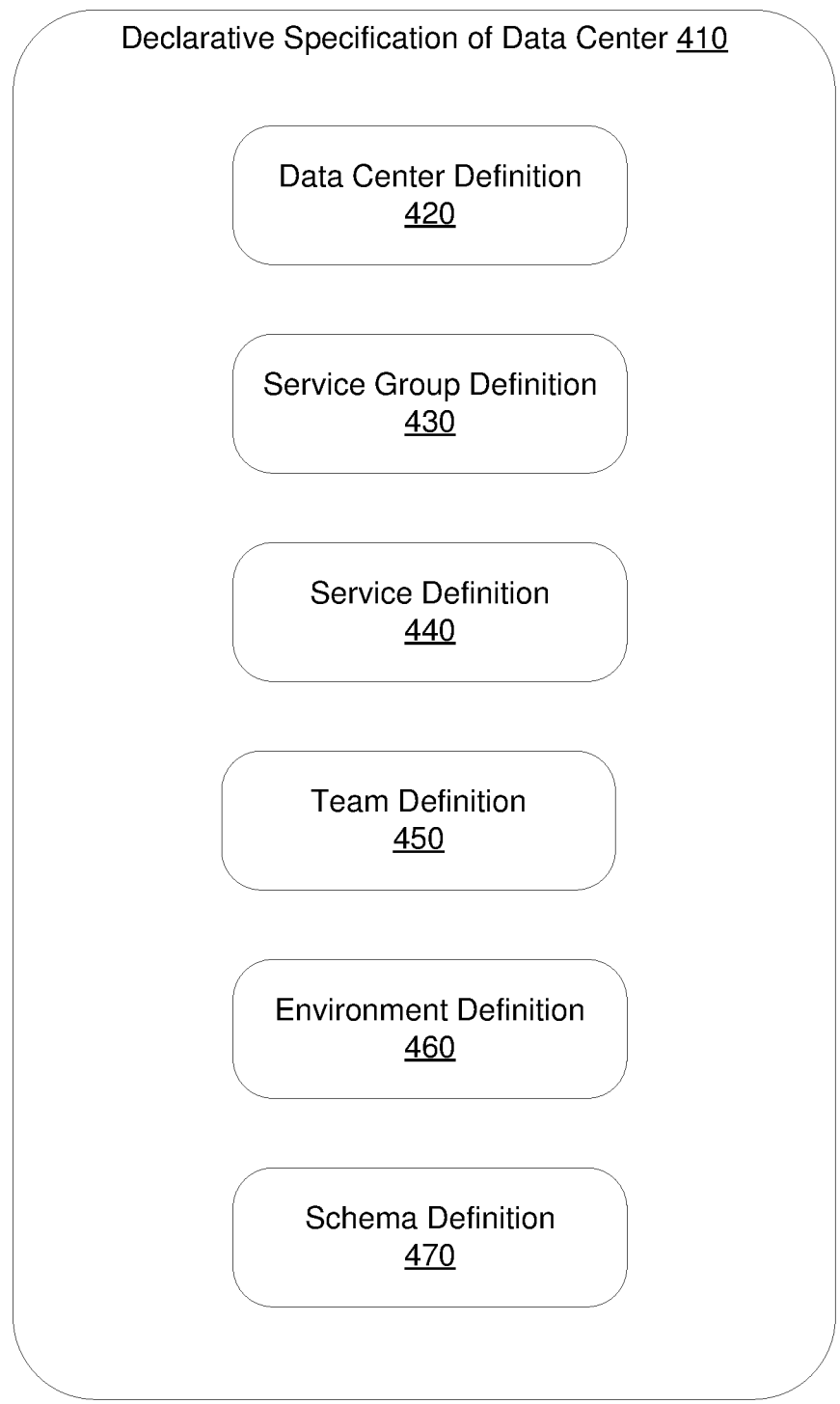
FIG. 4 illustrates an example of a data center declarative specification according to one embodiment.

The data center generation module 220 receives from users, for example, users of a tenant, a cloud platform independent declarative specification of a data center. The cloud platform independent declarative specification of a data center specifies various entities of the data center. In an embodiment, the cloud platform independent declarative specification of a data center comprises a hierarchical organization of datacenter entities, where each datacenter entity may comprise one or more services, one or more other datacenter entities or a combination of both. FIG. 4 describes various types of datacenter entities in further detail. The data center generation module 220 receives the platform independent declarative specification and a target cloud platform as input and generates a cloud platform specific metadata representation for the target cloud platform. The data center generation module 220 deploys the generated cloud platform specific metadata representation on the target cloud platform to create a data center on the target cloud platform according to the declarative specification.

The software release management module 230 receives as inputs (1) an artifact version map 225 and (2) a master pipeline 235. The artifact version map 225 identifies specific versions of software releases or deployment artifacts that are targeted for deployment on specific datacenter entities. The artifact version map 225 maps datacenter entities to software release versions that are targeted to be deployed on the datacenter entities. The master pipeline 235 includes instructions for operations related to software releases on the datacenter, for example, deployment of services, destroying services, provisioning resources for services, destroying resources for services, and so on.

The master pipeline 235 may include instructions for performing operations related to software releases for different environments such as development environment, test environment, canary environment, and production environment, and instructions for determining when a software release is promoted from one environment to another environment. For example, if the deployments of a software release in a development environment execute more than a threshold number of test cases, the software release is promoted for test environment for further testing, for example, system level and integration testing. If the software release in a test environment passes a threshold of test coverage, the software release is promoted to canary environment where the software release is provided to a small subset of users on a trial basis. If the software release in a canary environment executes without errors for a threshold time, the software release is promoted to production environment where the software release is provided to all users.

The software release management module 230 compiles the input artifact version map 225 and the master pipeline 235 to generate a cloud platform specific detailed pipeline 255 that is transmitted to the target cloud platform. The cloud platform specific detailed pipeline 255 includes instructions for deploying the appropriate version of a software release or deployment artifact on the datacenter entities as specified in the artifact version map 225. The software release management module 230 may receive modifications to one of the inputs. For example, a user may modify the input artifact version map 225 and provide the same master pipeline 235. Accordingly, the same master pipeline is being used but different software releases are being deployed on datacenter entities. The software release management module 230 recompiles the inputs to generate a new cloud platform specific detailed pipeline 255 that deploys the versions of software releases according to the new artifact version map 225.

The artifact version map may also be referred to as a deployment manifest, a version manifest, a software release map, or a software artifact version map. The master pipeline may also be referred to as a master deployment pipeline or a master orchestration pipeline.

Figure 2B:
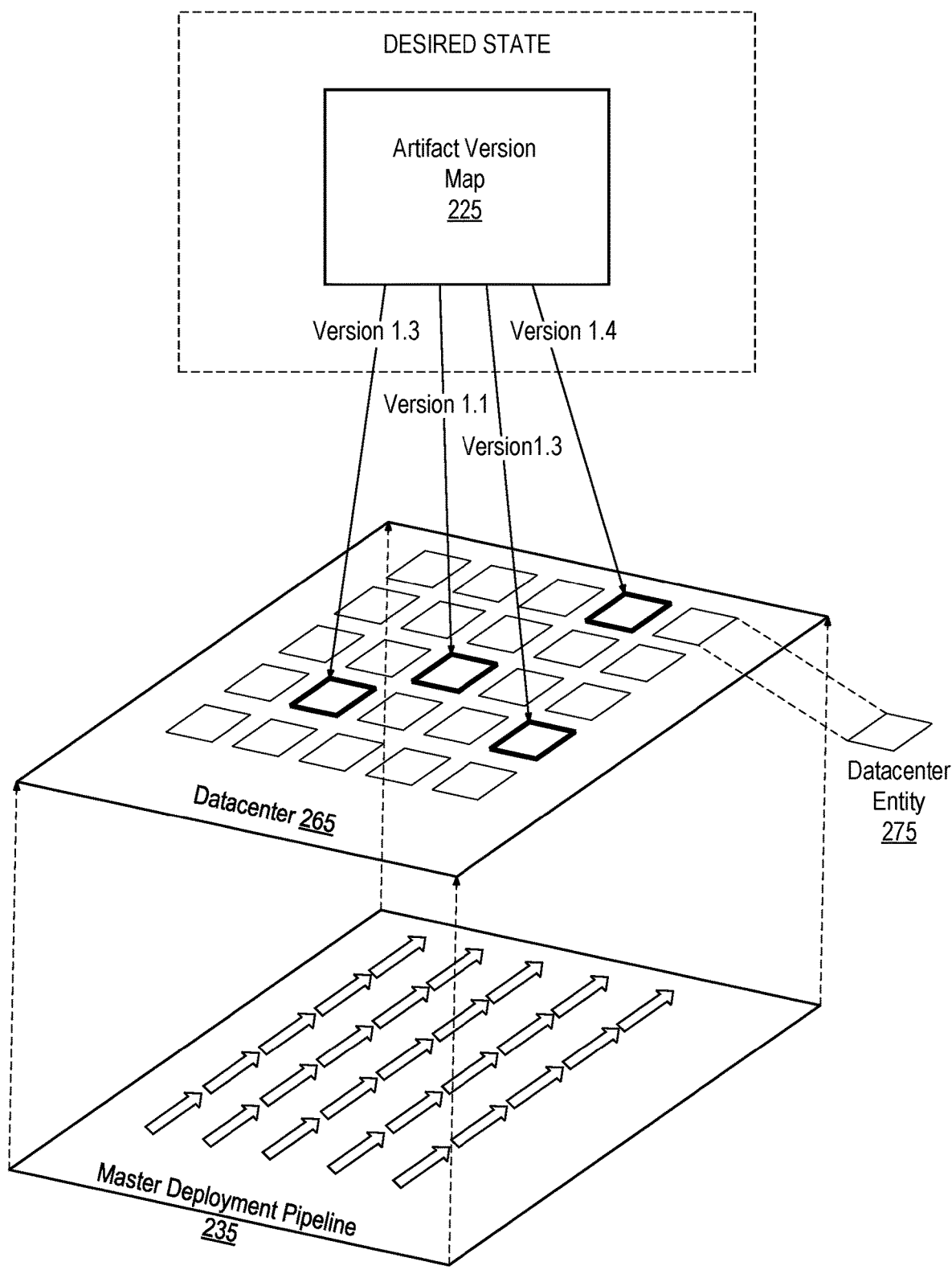
FIG. 2B illustrates the overall process for deploying software artifacts in a datacenter according to an embodiment.

FIG. 2B illustrates the overall process for deploying software artifacts in a datacenter according to an embodiment. FIG. 2B shows a layout of a datacenter 265 including various datacenter entities. As shown in FIG. 2B, the artifact version map 225 identifies the different versions of software that are targeted for release on different datacenter entities 275 of the datacenter 265. The master pipeline represents the flow of deployment artifacts through the various environments of the datacenter. The software release management module 230 combines the information in the master pipeline 235 with the artifact version map 225 to determine cloud platform specific detailed pipeline 255 that maps the appropriate version of software artifacts on the datacenter entities according to the artifact version map 225.

Figure 3:
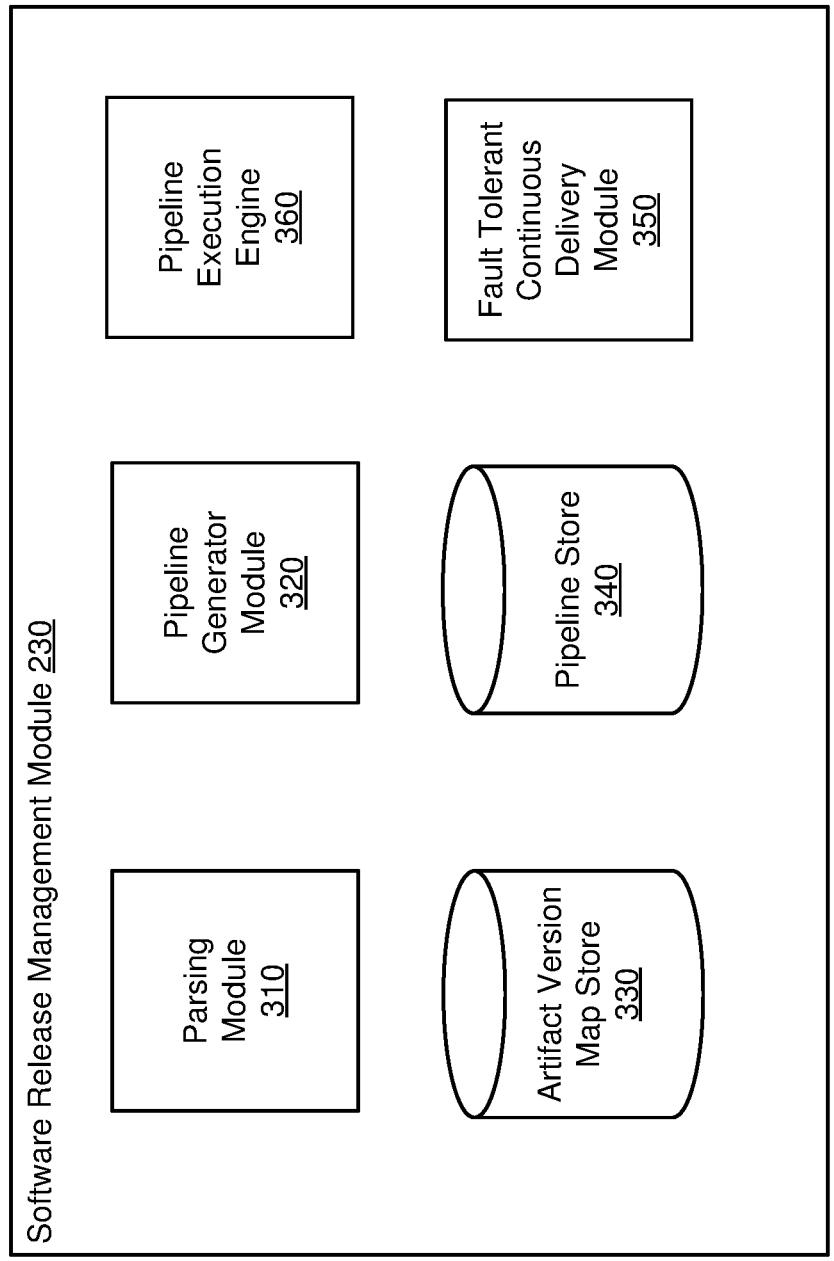
FIG. 3 is a block diagram illustrating the architecture of a software release management module according to one embodiment.

FIG. 3 is a block diagram illustrating the architecture of a software release management module 230 according to one embodiment. The software release management module 230 includes a parsing module 310, a pipeline generator module 320, an artifact version map store 330, a pipeline store 340, a fault tolerant continuous delivery module 350, and a pipeline execution engine 360. Other embodiments may include more, fewer, or different modules than those indicated herein in FIG. 3.

The parsing module 310 parses various types of user input including declarative specification of a data center, artifact version map 225, and master pipelines 235. The parsing module 310 generates data structures and metadata representations of the input processed and provides the generated data structures and metadata representations to other modules of the software release management module 230 for further processing.

The metadata store 340 stores various transformed metadata representations of data centers that are generated by the software release management module 230. The transformed metadata representations may be used for performing rollback to a previous version if an issue is encountered in a current version of the data center. The transformed metadata representations may be used for validation, auditing, governance, and so on at various stages of the transformation process.

The pipeline generator module 320 processes the master pipelines in conjunction with the artifact version map received as input to generate a detailed pipeline for a target cloud platform. The pipelines comprise stages that include instructions for provisioning services or deploying applications for deploying versions of software releases for various services on the cloud platform according to the artifact version map. The artifact version map store 330 stores artifact version maps received from users and the pipeline store 340 stores master pipelines as well as pipelines generated by the pipeline generator module 320.

The fault tolerant continuous delivery module 350 manages continuous delivery of software artifacts to datacenters configured in cloud platforms in a fault tolerant manner. The details of the fault tolerant continuous delivery module 350 are further illustrated in FIG. 12 and described in connection with FIG. 12.

The pipeline execution engine 360 executes the detailed pipelines generated by the pipeline generator module 320. In an embodiment, the pipeline execution engine 360 is a system such as SPINNAKER that executes pipelines for releasing/deploying software. The pipeline execution engine 360 parses the pipelines and executes each stage of the pipeline on a target cloud computing platform.

Cloud Platform-Based Data Center Generation

FIG. 4 illustrates an example of a declarative specification of a data center according to one embodiment. The declarative specification 410 includes multiple data center entities. A data center entity is an instance of a data center entity type and there can be multiple instances of each data center entity type. Examples of data center entities include data centers, service groups, services, teams, environments, and schemas.

The declarative specification 410 includes definitions of various types of data center entities including service group, service, team, environment, and schema. The declarative specification includes one or more instances of data centers. Following is a description of various types of data center entities and their examples. The examples are illustrative and show some of the attributes of the data center entities. Other embodiments may include different attributes and an attribute with the same functionality may be given a different name than that indicated herein. In an embodiment, the declarative specification is specified using hierarchical objects, for example, JSON (Javascript object notation) that conform to a predefined schema.

A service group 520 represents a set of capabilities and features and services offered by one or more computing systems that can be built and delivered independently, in accordance with one embodiment. A service group may be also referred to as a logical service group, a functional unit, or a bounded context. A service group 520 may also be viewed a set of services of a set of cohesive technical use-case functionalities offered by one or more computing systems. A service group 520 enforces security boundaries. A service group 520 defines a scope for modifications. Thus, any modifications to an entity, such as a capability, feature, or service offered by one or more computing systems within a service group 520 may propagate as needed or suitable to entities within the service group, but does not propagate to an entity residing outside the bounded definition of the service group 520. A data center may include multiple service groups 520. A service group definition specifies attributes including a name, description, an identifier, schema version, and a set of service instances. An example of a service group is a blockchain service group that includes a set of services used to providing blockchain functionality. Similarly, a security service group provides security features. A user interface service group provides functionality of specific user interface features. A shared document service group provides functionality of sharing documents across users. Similarly, there can be several other service groups.

Service groups support reusability of specification so that tenants or users interested in developing a data center have a library of service groups that they can readily use. The boundaries around services of a service groups are based on security concerns and network concerns among others. A service group is associated with protocols for performing interactions with the service group. In an embodiment, a service group provides a collection of APIs (application programming interfaces) and services that implement those APIs. Furthermore, service groups are substrate independent. A service group provides a blast radius scope for the services within the service group so that any failure of a service within the service group has impact limited to services within the service group and has minimal impact outside the service group.

Following is an example of a specification of a service group. The service group specifies various attributes representing metadata of the service group and includes a set of services within the service group. There may be other types of metadata specified for a service group, not indicated herein.

```
{
"service_group": [
  {
    "cells": [ ],
    "description": "Service group Service ]nstance Definitions",
    "service_group_id": "id1",
    "name": "name1",
    "schema_version": "1.0",
    "cluster_instances": [
        {
           "cluster_instance_name": "cluster1",
           "cluster_type": "cluster_type1"
        },
        {
           "cluster_instance_name": "cluster2",
           "cluster_type": "cluster_type1"
        },
        {
           "cluster_instance_name": "cluster3",
           "cluster_type": "cluster_type2"
        }
    ],
    "service_instances": [
       {
          "service_instance_name": "serviceinstance0001",
          "service_type": "servicetype1"
       },
       {
          "service_instance_name": "serviceinstance0002",
          "service_type": " servicetype1"
          "cluster_instance": "cluster1"
       },
       {
          "service_instance_name": "serviceinstance0003",
          "service_type": " servicetype2"
       },
       ...
    ],
    "service_teams": ["team1"],
    "type": "servicetype"
    "security_groups":[
      {
        "name":"group1",
        "policies":[
           {
             "description":"Allow access from site S1",
             "destination":{ "groups":[ "group2" ] },
             "environments":[ "dev", "test", "staging" ],
             "source":{
                "iplist":"URL1",
                "filters":[ filter-expression ]
             }
           ]
```

```
        }
      ]
    }
  ]
}
```

As shown in the example above, a service group may specify a set of clusters. A cluster represents a set of computing nodes, for example, a set of servers, a set of virtual machines, or a set of containers (such as KUBERNETES containers). A physical server may run multiple containers, where each container has its own share of filesystem, CPU, memory, process space, and so on.

The service group specifies a set of services. A service group may specify a cluster for a service so that the data center deployed on a cloud platform runs clusters of computing nodes and maps the services to clusters based on the specified mapping if included in the declarative specification. For example, in the service group example shown above, the service instance serviceinstance0002 is specified to run on cluster instance cluster1.

The service group may specify security groups, each security group specifying a set of services that are allowed to interact with each other. Services outside the security group are required to pass additional authentication to communicate with services within the security group. Alternatively, the services within a security group use one protocol to interact with each other and services outside the security group use a different protocol that requires enhances authentication to interact with services within the security group. Accordingly, a security group specifies policies that determine how services can interact with each other. A security policy may specify one or more environments for which the security policy is applicable. For example, a security policy policy1 may apply to a particular environment env1 (e.g., production environment) and another security policy policy2 may apply to another environment env2 (e.g., development environment). A security policy may be specified for a service group type or for a specific service type.

In an embodiment, the security policy specifies expressions for filtering the service groups based on various attributes so that the security policy is applicable to the filtered set of service groups. For example, the security policy may specify a list of IP (internet protocol) addresses that are white listed for a set of service groups identified by the filtered set and accordingly these computing systems are allowed access to the service group or to specific set of services within the service group.

In an embodiment, a security policy may specify for a service group, a set of source services and a set of destination services. The source services for a particular service specify the services outside the security group that are allowed to connect with this particular service. The destination services for a particular service specify the services outside the security group that this particular service needs to connect to. During provisioning and deployment, the data center generation module generates instructions for the cloud platform that implement specific network policies using cloud platform specific features and network functionality such that the network policies implement the security policies specified in the declarative specification.

A data center entity called a cell represents a set of services that interact with each other in a vertical fashion and can be scaled by additional instances or copies of the cell, i.e., copies of the set of services. Creating multiple instances of a cell allows a system to scale a set of services that interact with each other. A data center instance may include one or more cells. Each cell may include one or more services. A data center may include instances of service groups or cells.

A service definition specifies metadata for a type of service, for example, database service, load balancer service, and so on. The metadata be describe various attributes of a service including a name of the service, description of the service, location of documentation for the service, any sub-services associated with the service, an owner for the service, a team associated with the service, build dependencies for the service specifying other services on which this service depends at build time, start dependencies of the service specifying the other services that should be running when this particular service is started, authorized clients, DNS (domain name server) name associated with the service, a service status, a support level for the service, and so on. The service definition specifies a listening ports attribute specifying the ports that the service can listen on for different communication protocols, for example, the service may listen on a port p1 for UDP protocol and a port p2 for TCP protocol. Other services within the data center can interact with a service via the ports specified by the service.

The service definition specifies an attribute outbound access that specifies destination endpoints, for example, external URLs (uniform resource locators) specifying that the service needs access to the specified external URLs. During deployment, the data center generation module ensures that the cloud platform implements access policies such that instances of this service type are provided with the requested access to the external URLs.

The outbound access specification may identify one or more environment types for the service for which the outbound access is applicable. For example, an outbound access for a set of endpoints S1 may apply to a particular environment env1 (e.g., production environment) and outbound access for a set of endpoints S2 may apply to another environment env2 (e.g., development environment).

Following is an example of a service definition.

```
{
  "service_definition": [
    {
      "authorized_clients": [ ],
      "build_dependencies": [ ],
      "description": "description of service",
      "dns_name": "dns1",
      "documentation": "URL",
      "name": "name1",
      "namespace": "space1",
      "service_owner": "user1",
      "service_status": "GA",
      "service_team": "team1",
      "support_level": "STANDARD",
      "start_dependencies": ["svc5", "svc7", ...],
      "sub_services": [ "service1", " service2", " service3",   ...   ],
      "listening_ports":[
          { "protocol":"tcp", "ports":[ "53" ] },
          { "protocol":"udp","ports":[ "53" ] }
      "outbound_access":[
         {
           "destination":[
             {
               "endpoints":[ ".xyz.com:443", ".pqr.com:443" ]
             }
           ]
         }
      ],
```

```
    }
  ]
}
```

A team definition 450 includes team member names and other attributes of a team for example, name, email, communication channel and so on. Following is an example of a team definition. A service may be associated with one or more teams that are responsible to modifications made to that service. Accordingly, any modification made to that service is approved by the team. A service may be associated with a team responsible for maintenance of the service after it is deployed in a cloud platform. A team may be associated with a service group and is correspondingly associated with all services of that service group. For example, the team approves any changes to the service group, for example, services that are part of the service group. A team may be associated with a data center and is accordingly associated with all service groups within the data center. A team association specified at a data center level provides a default team for all the service groups within the data center and further provides a default team for all services within the service groups.

According to an embodiment, a team association specified at the functional level overrides the team association provided at the data center level. Similarly, a team association specified at the service level overrides the default that may have been provided by a team association specified at the service group level or a data center level. A team can decide how certain action is taken for the data center entity associated with the team. The team associations also determine the number of accounts on the cloud platform that are created for generating the final metadata representation of the data center for a cloud platform by the compiler and for provisioning and deploying the data center on a cloud platform. The data center generation module 210 creates one or more user accounts in the cloud platform and provides access to the team members to the user accounts. Accordingly, the team members are allowed to perform specific actions associated with the data center entity associated with the team, for example, making or approving structural changes to the data center entity or maintenance of the data center entity when it is deployed including debugging and testing issues that may be identified for the data center entity.

Conventional techniques associate the same team with the data center through out the design process thereby resulting in the organizational structure having an impact on the design of the data center or service group. Embodiments decouple the team definition from the constructions that define the data center entity, thereby reducing the impact of the teams on the design and architecture of the data center entity.

```
{
  "team_definition": [
    {
      "name": "team1",
      "description": "description of team",
      "admins": [
        "user1",
        "user2",
        "user3",
        "user4",
        ...
      ],
```

```
      "team_id": "id1",
      "owner": "owner_id",
      "email": "team1@xyz.com"
    }
  ],
  "communication_channel": "channel1"
  "schema_version": "1.0"
}
```

An environment definition 460 specifies a type of system environment represented by the data center, for example, development environment, staging environment, test environment, or production environment. A schema definition 470 specifies schema that specifies syntax of specific data center entity definitions. The schema definition 470 is used for validating various data center entity definitions. The data center generation module determines security policies for the data center in the cloud platform specific metadata representation based on the environment. For example, a particular set of security policies may be applicable for an environment env1 and a different set of security policies may be applicable for environment env2. For example, the security policies provide much more restricted access in production environment as compared to development environment. The security policy may specify the length of time that a security token is allowed to exist for specific purposes. For example, long access tokens (e.g., week long access tokens) may be allowed in development environment but access tokens with much smaller life time (e.g., few hours) used in production environment. Access tokens may allow users or services with access to specific cloud platform resources.

A data center definition 420 specifies the attributes and components of a data center instance. A declarative specification may specify multiple data center instances. The data center definition 420 specifies attributes including a name, description, a type of environment, a set of service groups, teams, domain name servers for the data center, and so on. A data center definition may specify a schema definition and any metadata representation generated from the data center definition is validated against the specified schema definition. A data center includes a set of core services and capabilities that enable other services to function within the data center. An instance of a data center is deployed in a particular cloud platform and may be associated with a particular environment type, for example, development, testing, staging, production, and so on.

Following is a definition of a data center instance. The data center instance definition includes a list of service groups included in the data center instance and other attributes including an environment of the data center, a data center identifier, a name, a region representing a geographical region, one or more teams associated with the data center, and a schema version.

```
{
  "datacenter_instance": {
    "environment": "env1",
    "datacenter_instance_identifier": "id1",
    "name": "data_center1",
    "region": "region1",
    "service_groups": [
      "service_group1",
      " service_group2",
      " service_group3",
      "service_group4",
      ...
```

```
      ],
      "schema_version": "1.0",
      "admin_team":"admins",
      ...
     }
    }
   }
  }
```

Figure 5:
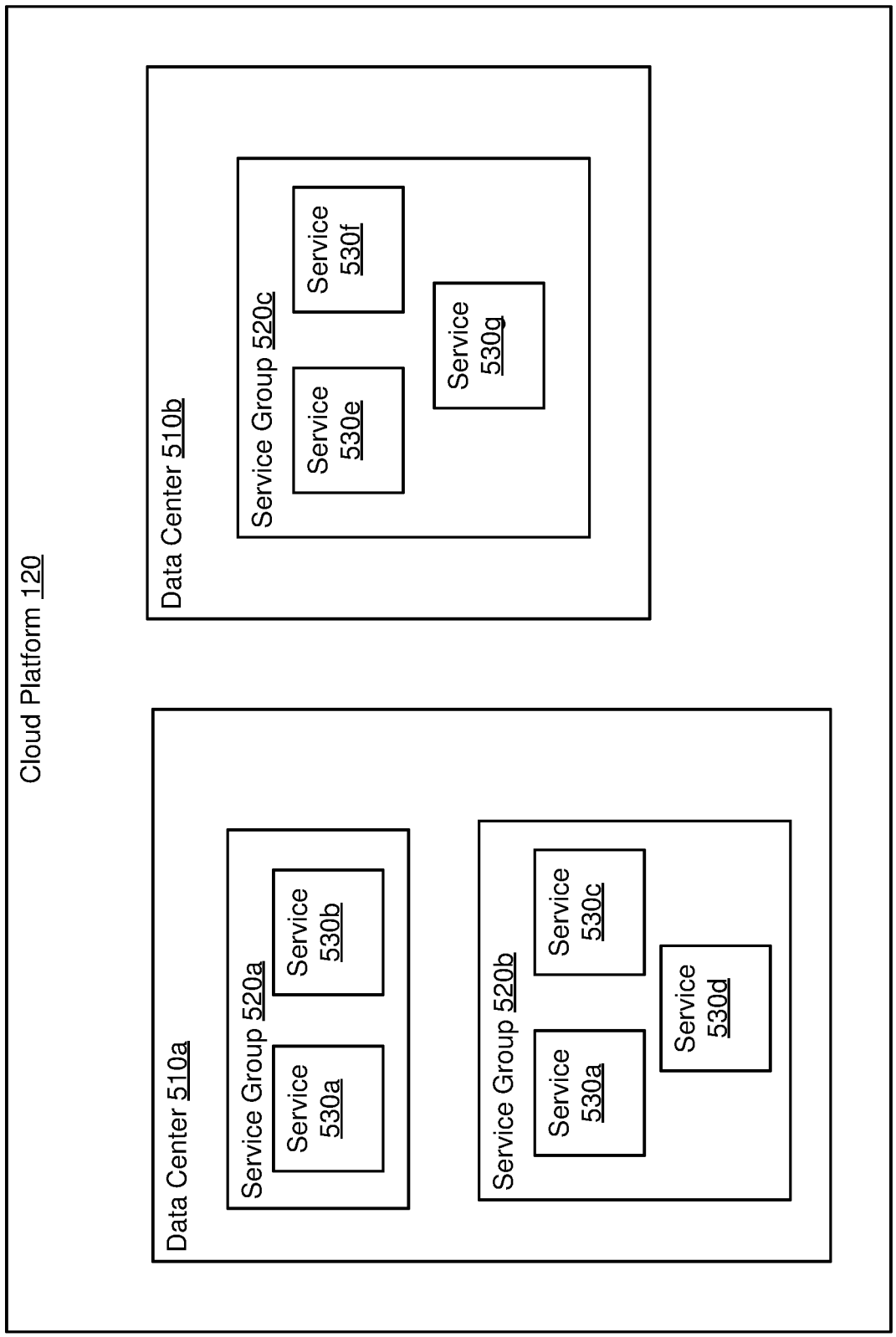
FIG. 5 illustrates example data centers created on a cloud platform based on a declarative specification according to one embodiment.

FIG. 5 illustrates some example data centers created on a cloud platform based on a declarative specification according to one embodiment. The data centers 510 may be created based on a declarative specification processed by the data center generation module 210. As shown in FIG. 5, multiple data centers may be configured within a cloud platform 120. Each data center 510 may correspond to a tenant 115 of a multi-tenant system 110. A tenant 115 may create one or more data centers 510. Alternatively, a data center 510 may be created by any computing system. Each data center includes one or more service groups. For example, data center 510*a* includes service groups 520*a* and 520*b* and data center 510*b* includes service group 520*c*. A data center may include multiple instances of a particular type of service group. Each service group includes a set of services. For example, service group 520*a* includes services 530*a* and 530*b*, service group 520*b* includes services 530*a*, 530*b*, and 530*c*, and service group 520*c* includes services 530*e*, 530*f*, and 530*g*. A service group may include multiple instances of services of the same service type.

The datacenter generation module 220 creates data centers on cloud platforms based on a declarative specification using the following steps. The data center generation module 210 receives a cloud platform independent declarative specification of a data center. The cloud platform independent declarative specification may be for a tenant of the multi-tenant system or for any other computing system, for example, an online system. The cloud platform independent declarative specification is specified using the cloud platform infrastructure language. The cloud platform independent declarative specification of the data center is configured to generate the data center on any of a plurality of cloud platforms.

The data center generation module 210 receives information identifying a target cloud platform for creating the data center based on the cloud platform independent declarative specification. The target cloud platform could be any of a plurality of cloud platforms, for example, AWS, AZURE, GCP, and so on. The data center generation module 210 further receives information to connect with the target cloud platform, for example, credentials for creating a connection with the target cloud platform. A cloud platform may also be referred to as a cloud computing platform.

The data center generation module 210 compiles the cloud platform independent declarative specification to generate a cloud platform specific data center representation for creating the data center on the target cloud computing platform. For example, the cloud platform specific data center representation may refer to user accounts, network addresses, and so on that are specific to the target cloud computing platform.

The data center generation module 210 sends the platform specific data center representation along with instructions for deploying the data center on the target cloud computing platform. The target cloud computing platform executes the instructions to configure the computing resources of the target cloud computing platform to generate the data center according to the platform specific data center representation. The data center generation module 210 provides users with access to the computing resources of the data center configured by the cloud computing platform. For example, if the data center was created for a tenant of the multi-tenant system, users associated with the tenant are provided with access to the data center.

Figure 6:
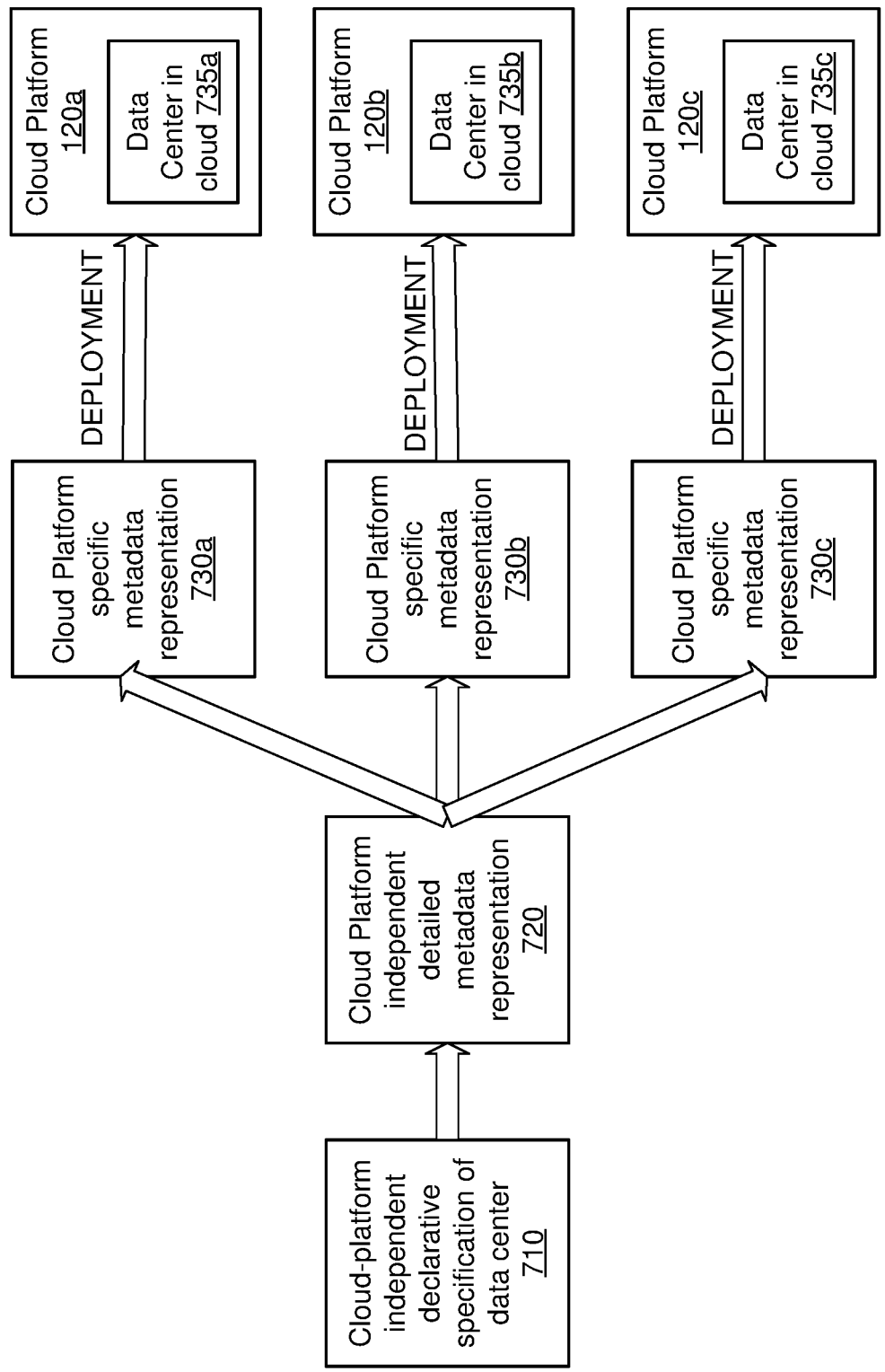
FIG. 6 is a block diagram illustrating generation of data centers on cloud platforms based on a declarative specification, according to one embodiment.

FIG. 6 is a block diagram illustrating generation of data centers on cloud platforms based on a declarative specification, according to one embodiment. The data center generation module 210 receives as input a cloud-platform independent declarative specification 610. The cloud-platform independent declarative specification 610 may be a version of the declarative specification that is being incrementally modified by users. The data center generation module 210 processes a particular version of the cloud-platform independent declarative specification 610. Since cloud-platform independent declarative specification 610 is not specified for any specific target cloud platform, the data center generation module 210 can configure a data center on any target cloud platform based on the cloud-platform independent declarative specification 610.

The data center generation module 210 processes the cloud-platform independent declarative specification 610 to generate a cloud-platform independent detailed metadata representation 620 for the data center. The cloud-platform independent detailed metadata representation 620 defines details of each instance of data center entity specified in the cloud-platform independent declarative specification 610. The data center generation module 210 creates unique identifiers for data center entity instances, for example, service instances.

In an embodiment, the cloud-platform independent detailed metadata representation 620 includes an array of instances of data center entity types, for example, an array of service group instances of a particular service group type. Each service group instance includes an array of service instances. A service instance may further include the details of a team of users that are allowed to perform certain actions associated with the service instance. The details of the team are used during provisioning and deployment by the data center generation module 210, for example, for creating a user account for the service instance and allowing members of the team to access the user account.

The cloud-platform independent detailed metadata representation 620 includes attributes of each instance of data center entity. Accordingly, the description of each instance of data center entity is expanded to include all details. As a result, the cloud-platform independent detailed metadata representation 620 of a data center may be significantly larger than the cloud-platform independent declarative specification 610. For example, the cloud-platform independent declarative specification 610 may be few thousand lines of specification, whereas the cloud-platform independent detailed data center representation 620 may be millions of lines of generated code. As a result, the data center generation module 210 keeps the cloud-platform independent detailed metadata representation 620 as immutable, i.e., once the representation is finalized, no modifications are performed to the representation. For example, if any updates, deletes, or additions of data center entities need to be performed, they are performed on the cloud platform independent declarative specification 610.

The data center generation module 210 receives a target cloud platform on which the data center is expected to be provisioned and deployed and generates a cloud platform specific detailed metadata representation 630 of the data center. For example, the data center generation module 210 interacts with the target cloud platform to generate certain entities (or resources), for example, user accounts, virtual private clouds (VPCs), and networking resources such as subnets on the VPCs, various connections between entities in the cloud platform, and so on. The data center generation module 210 receives resource identifiers of resources that are created in the target cloud platform, for example, user account names, VPC IDs, and so on, and incorporates these in the cloud-platform independent detailed metadata representation 620 to obtain the cloud platform specific metadata representation 630 of the data center. In an embodiment, the data center generation module 210 creates one unique user account on the cloud platform for each team for a given combination of a service group and a service. The user account is used by the team for performing interactions with that particular service for that service group, for example, for debugging, for receiving alerts, and so on.

The target cloud platform may perform several steps to process the cloud-platform specific detailed metadata representation 630. For example, the cloud platform independent declarative specification may specify permitted interactions between services. These permitted interactions are specified in the cloud-platform specific detailed metadata representation 630 and implemented as network policies of the cloud platform. The cloud platform may further create security groups to implement network strategies to implement the data center according to the declarative specification.

The cloud platform independent declarative specification specifies dependencies between services, for example, start dependencies for each service listing all services that should be running when a particular service is started. The data center generation module 220 generates the cloud platform specific detailed metadata representation of the data center that includes information describing these dependencies such that the instructions for deploying the service ensure that the cloud platform starts the services in an order specified by the dependencies such that for each service, the services required to be started before the service are running when the service is started. Accordingly, the dependencies between services represent a dependency graph and the cloud platform starts running the services in an order determined based on the dependency graph such that if service A depends on service B, the service B is started before service A is started.

The data center generation module 220 creates trust relationships between user accounts that allow services to access other services via secure communication channels. These trust relationships are generated using substrate specific instructions generated based on the declarative specification, for example, based on outbound access attributes specified for services. The data center generation module 220 sends instructions to the cloud platform to create network policies based on cloud platform specific mechanisms that control the interactions and access across service groups and services, for example, as specified by the constructs of the declarative specification such as outbound access, security groups, security policies and so on.

The data center generation module 210 deploys the cloud platform specific metadata representation 630 on the specific target cloud platform for which the representation was generated. The data center generation module 210 may perform various validations using the generated metadata representations, including policy validations, format validations, and so on.

The cloud platform independent declarative specification 610 may be referred to as a declared data center representation, cloud-platform independent detailed metadata representation 620 referred to as a derived metadata representation of the data center, and cloud platform specific metadata representation 630 referred to as a hydrated metadata representation of the data center.

Overall Process for Deployment of Software Artifacts on a Datacenter

Figure 7:
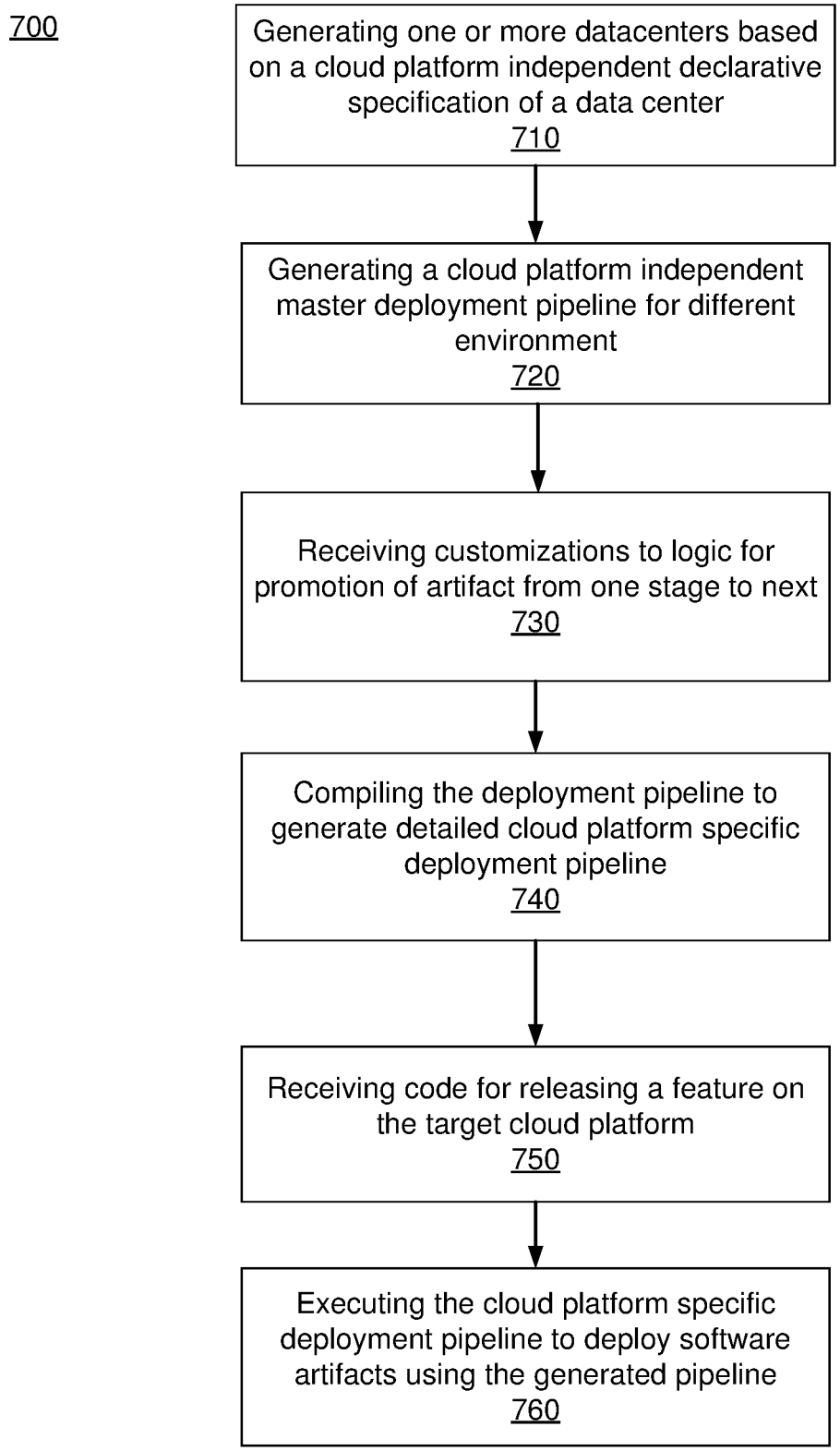
FIG. 7 shows the overall process for generating pipelines for deployment of software artifacts on datacenters configured on a cloud platform according to an embodiment.

FIG. 7 shows the overall process for generating pipelines for deployment of software artifacts on datacenters configured on a cloud platform according to an embodiment. The datacenter generation module generates 710 one or more datacenters on a target cloud platform. Each datacenter is generated from a cloud platform independent declarative specification and has a hierarchy of datacenter entities.

The software release management module 230 generates 720 a cloud platform independent master pipeline. In an embodiment, the cloud platform independent master pipeline includes stages corresponding to environments of the datacenters, for example, development environment, test environment, canary environment, and production environment. The master pipeline composes a sequence of progressive and/or conditional deployment across various environments such as development environment, test environment, staging environment, or production environment. The master pipeline may be triggered by delivery of the image for a software artifact and includes stages or instructions to deploy the build in environments of type development. The software artifact that is built is conditionally promoted to one or more test environments, followed by one or more canary environments before eventually getting deployed to production environments. The master pipeline may be customized by users, for example, service owners to represent a specific orchestration across environments. The master pipeline may be customized to capture specific promotion criteria for moving from one stage to next. For example, different tenants of the multi-tenant system may customize the master pipeline in a different manner. In an embodiment, the master pipeline by default uses the latest version of software for a software artifact for a service and builds and deploys the version across various environments. The user can use the artifact version map to ensure that a specific version of a software artifact is deployed on specific datacenter entities.

In an embodiment, each service deployed in the datacenter has a cloud platform independent master pipeline generated from the datacenter entities as defined by the declarative specification of the datacenter, for example, master pipeline for datacenter instances, master pipeline for service groups, master pipeline for cells, master pipeline for services, and so on. The master pipelines may be triggered on delivery of images of software artifacts. The master pipelines may implement a service owner-controlled continuous deployment. The master pipelines may implement datacenter instance owner-owned or release owner-owned on-demand deployment.

Certain portions of the master pipeline may be customized by the users, for example, by tenants of a multi-tenant system that are deploying services on a datacenter. For example, the promotion decision pipeline may be customized by a tenant to determine which test cases are executed and what threshold is The software release management module 230 receives 730 customizations to logic for promoting a software artifact from one stage to another stage of the cloud platform independent master pipeline.

The software release management module 230 compiles 740 the cloud platform independent master pipeline to generate a cloud platform specific detailed deployment pipeline that is specific to the hierarchy of datacenter entities of each datacenter as specified by the cloud platform independent declarative specification for the datacenter.

The software release management module 230 further receives 750 code for releasing one or more features of services deployed on the datacenter. The software release management module 230 executes 760 the cloud platform specific detailed deployment pipeline to deploy software artifacts based on the received code.

Figure 8:
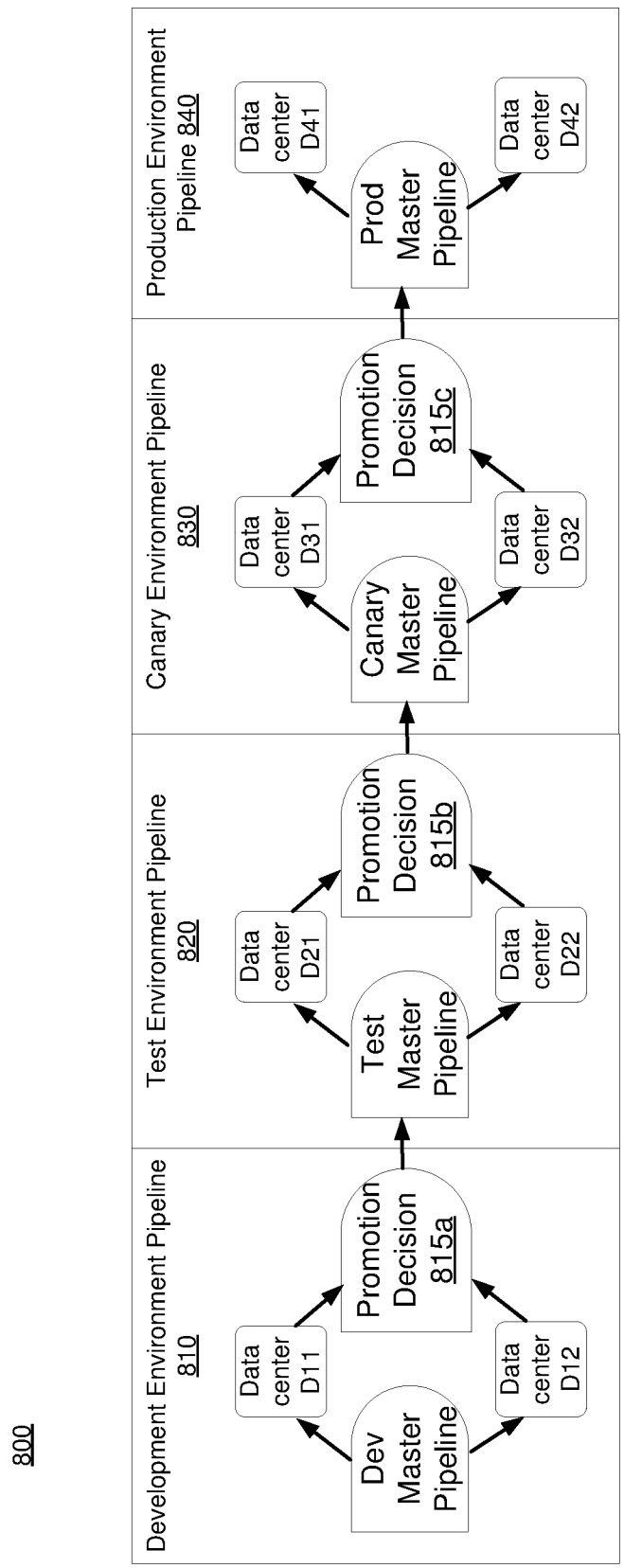
FIG. 8 illustrates an example master pipeline according to an embodiment.

FIG. 8 illustrates an example master pipeline 800 according to an embodiment. A master pipeline represents a sequence of stages that represent progressive conditional deployment across various datacenter environments. FIG. 8 shows stages for different environments of datacenter including development environment, test environment, canary environment, and production environment. Each stage further represents a pipeline that is executed for that stage. Accordingly, the master pipeline 800 includes a development environment pipeline 810 which feeds into a test environment pipeline 820, which feeds into a canary environment pipeline 830, which feeds into production environment pipeline 840.

The pipeline at each stage is a hierarchical pipeline comprising lower level pipelines. For example, the development environment pipeline 810 comprises a development master pipeline that feeds into datacenter pipelines D11, D12, . . . , depending on the number of datacenters specified as having development environment in the declarative specification of the datacenters.

The test environment pipeline 820 comprises a test master pipeline that feeds into datacenter pipelines D21, D22, . . . , depending on the number of datacenters specified as having test environment in the declarative specification of the datacenters.

The canary environment pipeline 820 comprises a canary master pipeline that feeds into datacenter pipelines D31, D32, . . . , depending on the number of datacenters specified as having canary environment in the declarative specification of the datacenters.

The production environment pipeline 820 comprises a production master pipeline that feeds into datacenter pipelines D21, D22, . . . , depending on the number of datacenters specified as having test environment in the declarative specification of the datacenters.

Each environment pipeline 810, 820, 830 includes a promotion decision pipeline 815a, 815b, 815c respectively. The outputs of the datacenter pipelines of the environment pipeline are collected by the promotion decision pipeline 815 that determines whether the software artifact is ready for promotion to the next stage. The promotion decision pipeline 815 may determine based on test case results obtained by the datacenters whether the software artifact for the service is promoted to the next stage. For example, if more than a threshold test cases are passed, the promotion decision pipeline 815 promotes the software artifact to the next stage. The last environment stage, for example, the production environment pipeline may not have a promotion decision pipeline since there is no subsequent stage to which the software artifact needs to be promoted. As shown in FIG. 8, the promotion decision pipeline 815a of development environment pipeline determines whether to promote the software artifact from development stage to test stage; the promotion decision pipeline 815b of test environment pipeline determines whether to promote the software artifact from test stage to canary stage, and the promotion decision pipeline 815c of canary environment pipeline determines whether to promote the software artifact from canary stage to production stage.

A master pipeline comprises multiple pipelines, for example, a provisioning pipeline for provisioning resources of the target cloud platform and a deployment pipeline for deploying a software artifact on a data center entity. Each pipeline comprises a sequence of stages, each stage representing one or more actions that need to be performed by the target cloud platform towards provisioning and deploying of the data center. The data center generation module 210 generates detailed pipelines for deploying versions of software artifacts on datacenter entities.

In an embodiment, the pipeline generator module 320 generates detailed pipelines using pipeline templates that include variables. A pipeline template is converted into a pipeline by providing specific values of the variables in the pipeline. The process of generating a pipeline from a template is referred to as hydration of the pipeline template. A pipeline template contains templating expressions used as placeholders for actual values used in the deployment. For example, a templating expression may be replaced by target specific parameter values or expressions. Multiple pipeline instances may be generated by hydrating the pipeline template for different targets. The template variables represent parameters that may be replaced with specific values for a given target to generate a pipeline instance specific to that target. For example, a template variable "account_id" may be replaced with an actual value of account_id, for example, "12345" during hydration.

In one embodiment, the pipeline generator module 320 generates pipelines in a hierarchical fashion based on the hierarchy of the data center entities of the data center. For example, the data center comprises data center entities of different types including data centers, service groups, services, and so on. A data center entity may include one or more child data center entities. For example, a data center includes one or more service groups as child data center entities. A service group includes one or more services as child data center entities. Accordingly, the data center generation module 210 starts at a data center entity at a level of the hierarchy and generates pipelines of data center entities below that level. For example, the pipeline generator module 320 starts at the data center level and generates pipelines for service groups within the data center. For each service group, the pipeline generator module 320 generates pipelines for services within the service group.

The process for executing pipelines according to one embodiment is as follows. The software release deployment module 230 receives a request to deploy a software artifact on a set of data center entities in the target cloud platform. The software release deployment module 230 executes the master pipeline for one or more datacenters. The software release deployment module 230 executes the aggregate pipelines for each service group of each datacenter. The aggregate pipeline comprises pipelines for services within the service group. For each service within each service group, the pipeline is executed by executing all the stages of the pipeline. The execution of the provisioning pipelines results in provisioning of the resource for a service and the deployment pipeline causes deployment of the service in the target cloud platform.

Figure 9:
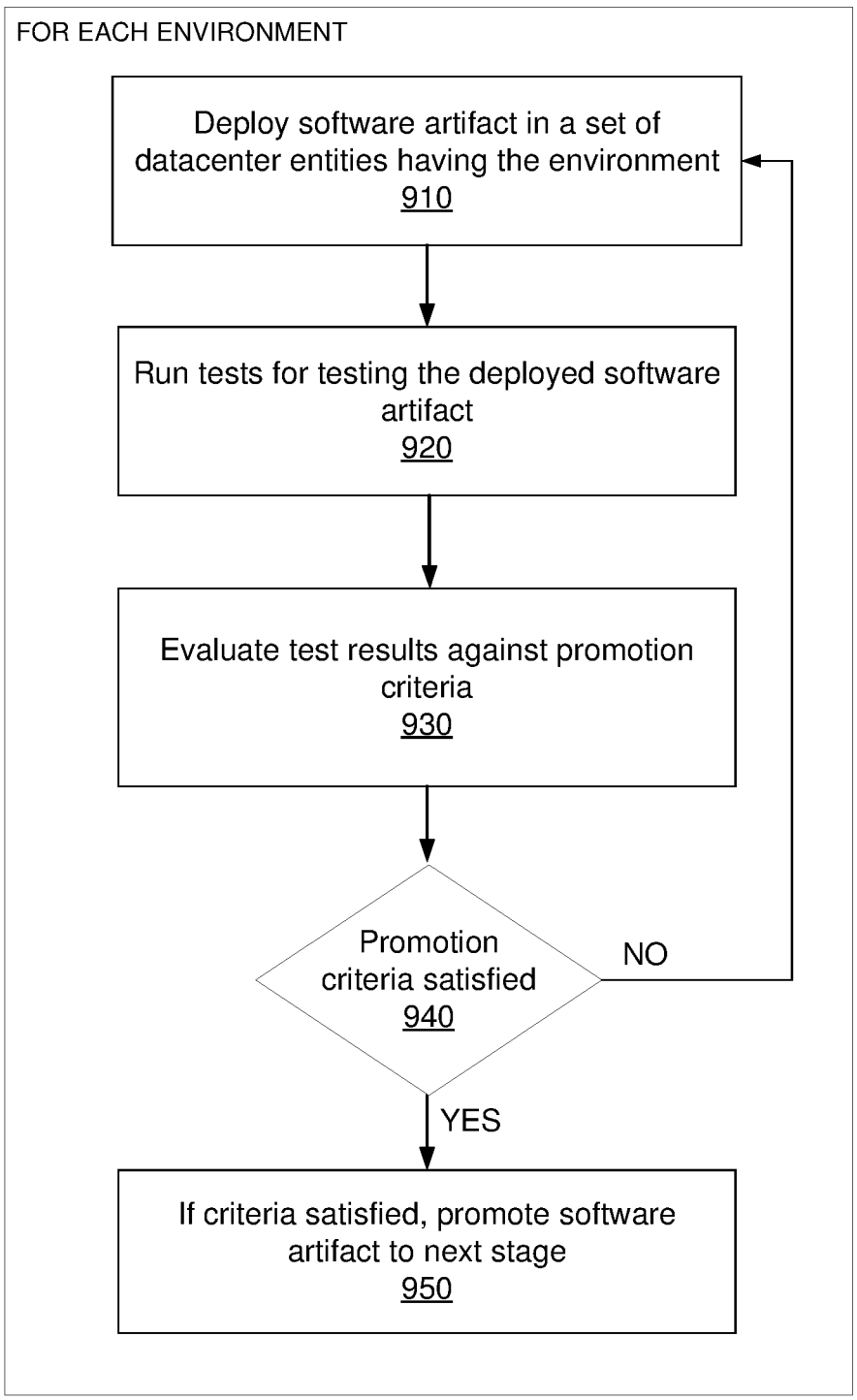
FIG. 9 shows the overall process executed by a stage for an environment of the master pipeline on a cloud platform according to an embodiment.

FIG. 9 shows the overall process executed by a stage for an environment of the master pipeline on a cloud platform according to an embodiment. The steps 910, 920, 930, 940, and 950 may be performed by each environment pipeline 810, 820, 830. The production environment pipeline 3 may execute only steps 910 and 920. The steps shown in FIG. 9 may be performed for one service or for multiple services specified using a manifest file.

The environment pipeline for an environment E includes instructions to deploy 910 the software on a set of datacenter entities, for example, a set of datacenter entities specified as having the environment E. In an embodiment, the software artifact is generated by compiling source code for a service. The source code may be obtained from a version control software. The set of datacenter entities may include datacenter instances, service groups, cells, services, or any combination of these.

The environment pipeline for the environment E further includes instructions for running 920 tests for testing the deployed software artifact on the set of datacenter entities. The environment pipeline for the environment E further includes instructions for evaluating 930 the test results against promotion criteria, for example, using the promotion decision pipeline 815. If the promotion criteria are not satisfied, the steps 910, 920, 930, and 940 may be repeated using a revised software artifact, for example, a software artifact generated from source code that includes fixes for certain defects identified during the testing 920. The environment pipeline for the environment E further includes instructions for proceeding 950 to the next stage if the promotion criteria are satisfied.

In an embodiment, the master pipeline comprises a hierarchy of pipelines. The hierarchy comprises multiple levels and pipelines at a particular level include pipelines of the next lower level as children pipelines. For example, at the highest level of hierarchy the master pipeline includes a release master pipeline that deploys a set of services related to a product. The next level of hierarchy includes service master pipelines that represent al deployments of a particular service across various environments. The next level of hierarchy may include service group master pipelines followed by service master pipelines.

Figure 10:
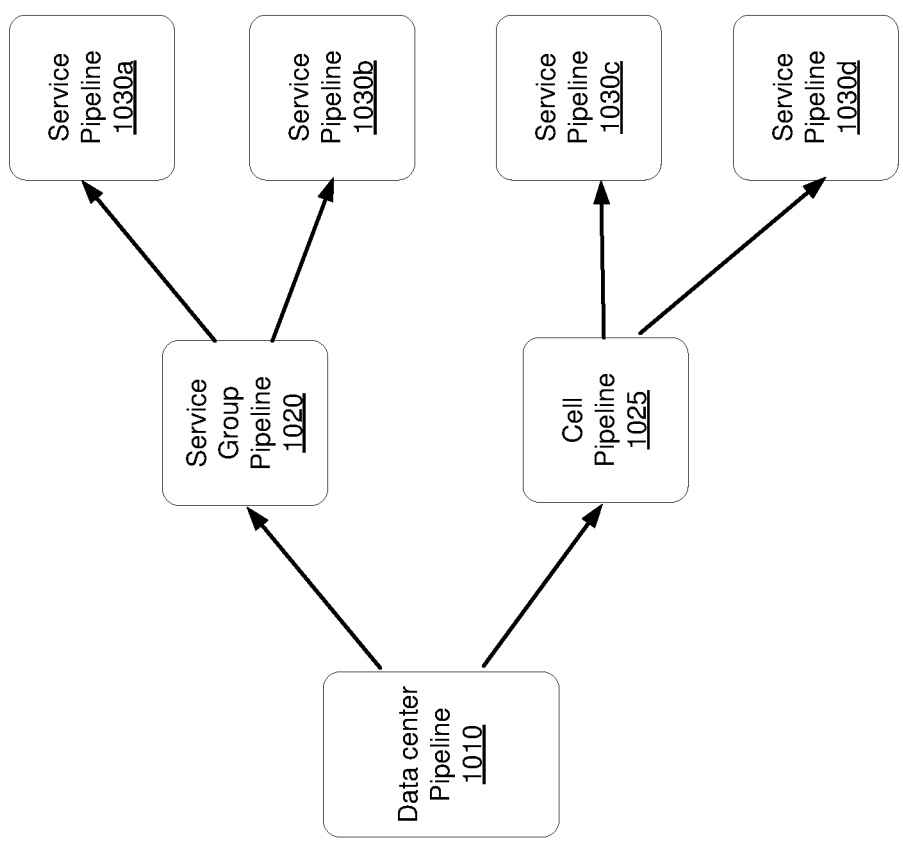
FIG. 10 shows an example master pipeline according to an embodiment.

FIG. 10 shows an example master pipeline according to an embodiment. The master pipeline is a hierarchical pipeline where each stage of a pipeline may comprise a pipeline with detailed instructions for executing the stage. The master pipeline hierarchy may mirror the datacenter hierarchy. For example, the top level of the master pipeline represents a sequence of stages for different environments. Each environment may include one or more pipelines for datacenter instances or pipelines for other types of datacenter entities. A datacenter instance pipeline 1010 may include service group pipelines 1020. Each service group pipeline 1020 may include one or more service pipelines 1030. A datacenter instance pipeline 1010 may include cell pipelines 1025, each cell pipeline 1025 comprising one or more service pipelines 1030. The service pipeline 1030 may comprise stages, each stage representing a pipeline representing instructions for deploying the service for specific environments. The lowest level pipeline or the leaf level pipeline in the hierarchy is referred to as a unit pipeline and may include detailed service specific instructions for performing an operation related to a service. For example, deployment for a service may include pre-deployment steps, deployment steps, post deployment steps, and post deployment test and validation step. A pipeline that is not a leaf level pipeline and has one or more child pipeline is an aggregate pipeline that orchestrates executions of the child pipelines.

A master pipeline may be driven by pull requests that occur a version control system for software receives a request for considering changes committed to an external repository for inclusion in a project's main repository. Accordingly, the master pipeline is automatically triggered when a pull request is received and deploys a software artifact based on the latest software version for which the pull request is received. The master pipeline performs continuous delivery of software artifacts based on pull requests. The master pipeline may be driven based on an on-demand manner, for example, by invoking a request using application programming interface (API) of the deployment module 210. The on-demand deployment based on master pipelines may be requested for any set of services and for any version for a given service as specified using the API. The master pipeline may be invoked to request a rollback from the current version to a previous version or a rollforward from the currently deployed version to a more recent version.

In an embodiment, the deployment module 210 creates a service master pipeline for each service. These pipelines get triggered when a pull request is received for a repository of the software. The deployment module 210 receives pipeline templates from users for specific services. These pipeline templates include detailed instructions for testing, validation, build, etc. for specific services. The datacenter generation module 220 receives a cloud platform independent declarative specification for one or more datacenters. The datacenter generation module 220 generates (or configures) datacenters according to the received cloud platform independent declarative specifications. The deployment module 210 receives promotion decision 815 pipelines. The promotion decision 815 pipelines are integrated into the overall master pipeline.

The pipeline generator creates all pipelines for each datacenter from the templates and combines them via master pipelines in a hierarchical fashion, for example, as illustrated in FIG. 10. In an embodiment, the pipeline generator generates service pipelines for individual services; the pipeline generator generates cell master pipelines to invoke the service pipelines; the pipeline generator generates service group master pipelines to invoke cell master pipelines; the pipeline generator generates datacenter instance master pipelines to invoke service group pipelines; the pipeline generator generates a service master pipeline to invoke the datacenter instance master pipelines.

Following is a snippet of a master pipeline showing various stages. Each stage may specify attributes including a stage name, a type of pipeline, a stage type (e.g., master deployment pipeline or promotion pipeline), prior stages, and so on.

```
{
  "stages": [
    {
      "stage_name": "Artifact version map for service SVC",
      "stage_type": "version_map",
      "prior_stage_ids": [ ]
    },
    {
      "pipeline_type": "env-type-aggregate",
      "template_name": "deploy_dev.j2",
      "stage_name": "Deploy to dev env",
      "stage_type": "master_deployment_pipeline",
      "prior_stage_ids": [    "Artifact version map for service SVC"   ]
    },
    {
      "promote_to": "test",
      "template_name": "promotej2",
```

```
    "pipeline_type": "promotion",
    "stage_name": "Promote to test env",
    "stage_type": "promotion",
    "prior_stage_ids": [    "Deploy to dev env"    ]
},
{
    "pipeline_type": "env-type-aggregate",
    "template_name": "deploy_test.j2",
    "stage_name": "Deploy to test env",
    "stage_type": "master_deployment_pipeline",
    "prior_stage_ids": [    "Promote to test env"    ]
},
{
    "promote_to": "stage",
    "template_name": "promote.j2",
    "pipeline_type": "promotion",
    "stage_name": "Promote to staging env",
    "stage_type": "promotion",
    "prior_stage_ids": [    "Deploy to test env"    ]
},
{
    "promote_to": "stage",
    "template_name": "promote.j2",
    "pipeline_type": "promotion",
    "stage_name": "Promote to staging env",
    "stage_type": "promotion",
    "prior_stage_ids": [    "Deploy to test env"    ]
} ...
```

As shown in the examiner master pipeline, the first stage is an artifact version map. The next stage is a master deployment pipeline for deploying to development environment. The next stage is a promotion pipeline for determining whether the software artifact can be promoted to the next stage. The next stage is a master deployment pipeline for deploying to test environment. The next stage is a promotion pipeline for determining whether the software artifact can be promoted to the next stage that is staging environment.

Software Artifact Version Map

In an embodiment, the deployment module 210 receives an artifact version map that associates various software artifacts and their versions with datacenter entities. The artifact version map provides a declarative specification of the specific versions of software artifacts that need to be deployed for services in different datacenter entities. Each datacenter entity may be uniquely identified based on its location within the datacenter hierarchy as specified by the declarative specification of the datacenter. For example, for a service, a software library may act as a software artifact. The software artifact may have multiple versions, for example, V1, V2, V3, and so on. The artifact version map may specify that version V1 needs to be deployed in datacenter entities C1 and C2 and version V2 needs to be deployed in datacenter entities C3 and C4. The deployment module 210 generates master pipelines and instructions that ensure that the appropriate software artifact versions are deployed in the datacenter entities as specified in the artifact version map.

In an embodiment, the artifact version map is specified as a JSON (Javascript object notation) file, a YAML file, or a file using any other syntax for representing nested objects. The artifact version map may comprise a set of <service>: <version> key pairs that are associated with various datacenter entities distributed across a hierarchy of a datacenter. The artifact version map key pairs act as whitelists for corresponding pipelines. If a key for a service is not included into an artifact version map, all pipelines for that service are excluded during execution of the pipeline. Different artifact version maps may be applied to the same master pipeline resulting in different services being included/excluded during execution of the master pipeline.

Following is an example artifact version map. The artifact version map specifies environment types using the attribute "env_types". In the following example, the environment type development is specified. The environment type may include one or more datacenter instances; a datacenter instance may include one or more service groups, a service group may include one or more services. In the following example, the software artifact name is specified as library1 and version as version1 and is associated with the service instance instance001. However, the software artifact name and version may be associated with any level of datacenter entity in the hierarchy. For example, of the software artifact name and version is specified or a service group, the software artifact name and version is applicable to all services within the service group unless the software artifact name and version is overridden with different values of the software artifact name and version specified for a particular service instance within the service group. Similarly, the software artifact name and version can be specified for a datacenter instance and is applicable to all service groups or cells within the datacenter instance unless an overriding value is specified for a service group.

```
{
    "name": "artifact_version_map1",
    "schema_version" : "0.1",
    "release_label": "release1.1",
    "deployments": {
        "env_types" : [
            {
                "name": "development",
                "datacenter_instances": [
                    {
                        "name": "datacenter1",
                        "service_group": [
                            {
                                "name": "service_group1",
                                "services": [
                                    {
                                        "service_instance": "instance001",
                                        "name": "service1",
                                        "versions": [
                                            {
                                                "software_artifact_name": "library1",
                                                "version": "version1"
                                            }
                                        ]
                                    }
                                ]
                            }
                        ]
                    }
                ]
            }
        ],
    }
}
```

In an embodiment, the artifact version map specifies a datacenter entity using a full path of the datacenter entity, for example, "stagger_group1/datacenter1/service_group2/service1". In an embodiment, the artifact version map specifies a set of datacenter entities using regular expressions in the full path of the datacenter entity. For example, a full path that includes service_group[?] includes service_group1, service_group2, service_group3, and so on.

Following is an example of an artifact version map specifying regular expressions to define a set of services. The environment types are specified as dev and test and the datacenter entities in the full path including datacenter instances and service groups are specified as wildcards and service instances are specified as "service*". Accordingly, for all datacenter instances for dev and test environments, for all service groups, for services names matching service*, the version V1 of application app1 will be deployed.

```
env_types:
    - name: "dev | test"
        datacenter_instances:
            - name: "(.*)"
                service_group:
                    - name: "(.*)"
                        services:
                            - service_instance: "service*"
                                name: "app1"
                                versions:
                                    version: "V1"
```

In some embodiments, the artifact version map may specify parameters used by pipelines. Accordingly, the specified parameters will be applicable to a stagger group for which the parameter is specified.

Figure 11:
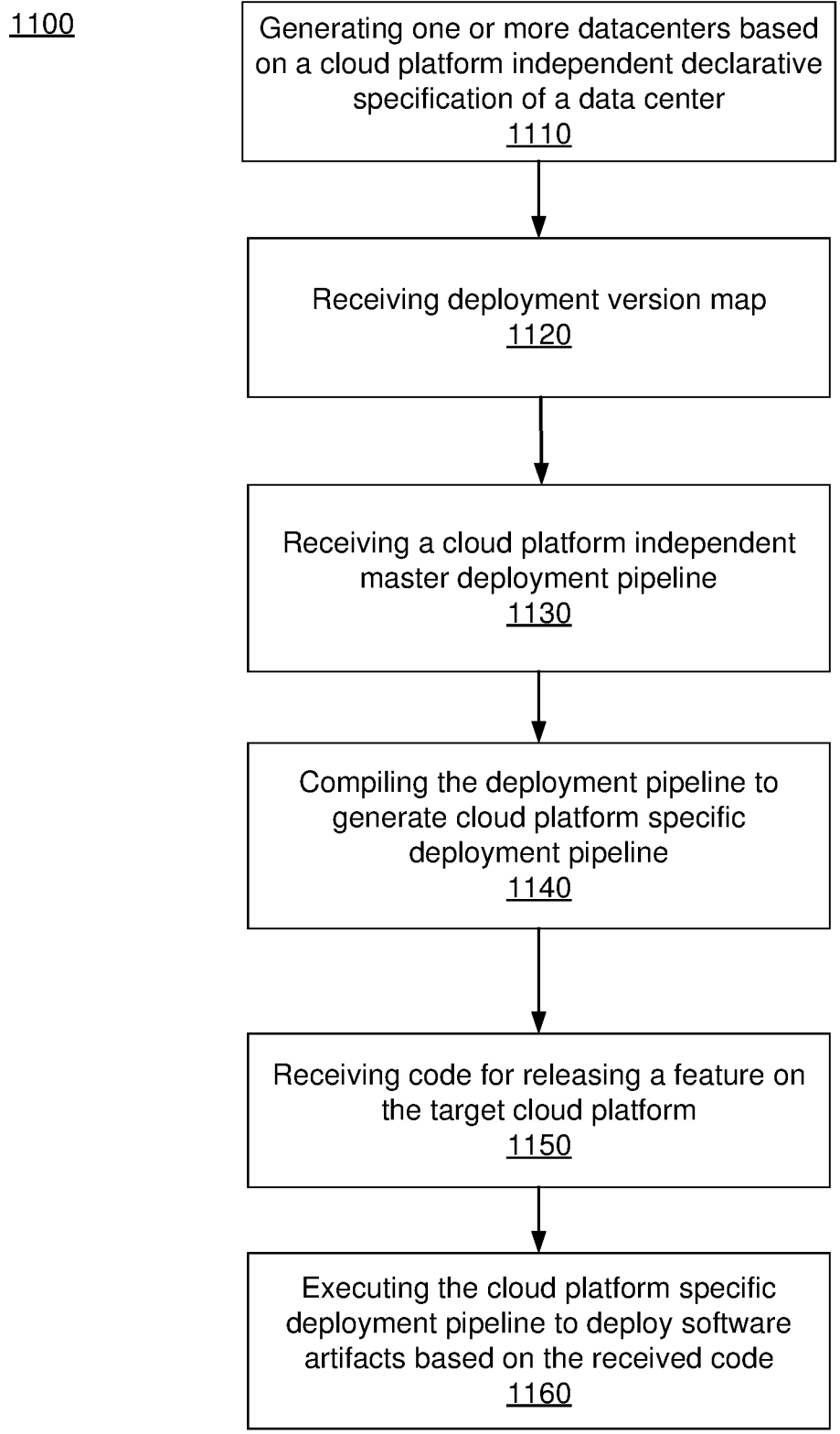
FIG. 11 shows the overall process for deployment of software artifacts on datacenters configured on a cloud platform according to an embodiment.

FIG. 11 shows the overall process for deployment of software artifacts on datacenters configured on a cloud platform according to an embodiment. The datacenter generation module generates 1110 one or more datacenters on a target cloud platform. Each datacenter is generated from a cloud platform independent declarative specification and has a hierarchy of datacenter entities.

The software release management module 230 receives 1120 as input, an artifact version map that maps datacenter entities to versions of software artifacts. The software release management module 230 also receives 1130 as input, a cloud platform independent master pipeline.

The software release management module 230 compiles 1140 the cloud platform independent master pipeline in conjunction with the artifact version map to generate a cloud platform specific detailed pipeline. In an embodiment, the generated cloud platform specific detailed pipeline includes artifact version map filters before certain stages to determine whether certain stages should be enabled or disabled according to the artifact version map.

The software release management module 230 further receives 1150 code for releasing one or more features of services deployed on the datacenter. For example, the code may represent source code obtained from a version control management system storing source code repositories to which changes are submitted by developers. The software release management module 230 executes 1160 the cloud platform specific deployment pipeline to deploy software artifacts based on the received code.

The artifact version map and master pipelines can be used to orchestrate various types of operations related to continuous delivery of software artifacts in a cloud-based datacenter. The artifact version map and the master pipelines can be configured to perform aggregate retry operations for a service or a service group or any datacenter entity. The artifact version map includes configurations of retry operations for a datacenter entity, including the retry strategy, a threshold number of retries to perform in case of failure to execute a stage of a pipeline, whether confirmation from a user is required before retrying or retry is performed automatically, and so on. For example, a retry strategy may be a fixed backoff strategy that pauses execution for a fixed period of time before retrying. Other retry strategies may be configured using artifact version map and master pipelines.

In an embodiment, the pipeline generator introduces an invoke retrier stage within an aggregate pipeline to trigger a retry strategy if a previous pipeline stage fails. The retry strategy and configuration parameters specified for a datacenter entity applies to all datacenter entities and services within the datacenter entity unless the value is overridden for a nested datacenter entity.

System Architecture for Fault Tolerant Continuous Delivery

The continuous delivery (CD) platform as disclosed includes many software components needed to provide the ability to get new features, configuration changes, bug fixes and customizations into production, safely and quickly in a sustainable way. These changes may be performed in tenant datacenters deployed on a cloud platform that represent datacenter configured for tenants of a multi-tenant system. Alternatively, these changes may be performed in any datacenter deployed on a cloud platform. The software components of a continuous delivery platform also require a software development life cycle (SDLC) which causes a circular dependency between the platform that provides continuous delivery and the process to provide continuous delivery to the platform itself. For example, the software components of the continuous delivery platform also need to be installed and may need updates, patches and so on. During the period in which the continuous delivery platform is being upgraded, the system may not be able to perform continuous delivery for tenant datacenters. The system disclosed according to various embodiments ensures fault tolerance and high availability of the continuous delivery platform. For example, the system according to various embodiments ensures close to zero down time of the continuous delivery platform. Such high availability of significant for large enterprises that have several services running on datacenters deployed on the cloud platform or have multiple datacenters configured on the cloud platform. Examples of such systems include multi-tenant systems that configure multiple datacenters in one or more cloud platforms for several enterprises that represent tenants of the multi-tenant system.

Figure 12:
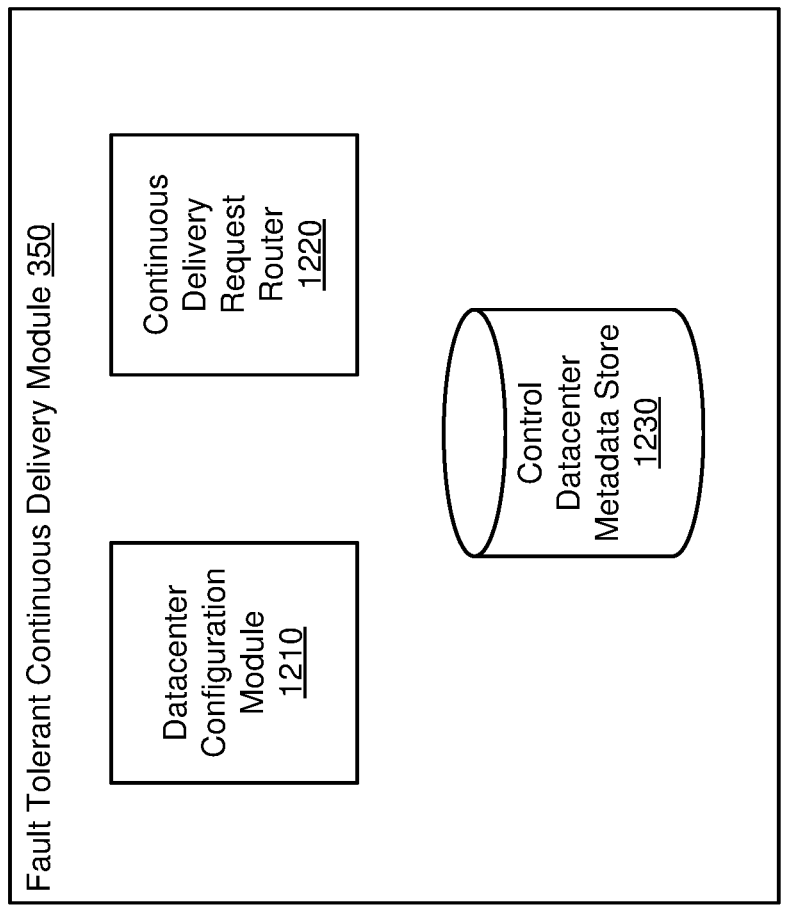
FIG. 12 is a block diagram illustrating the architecture of a fault tolerant continuous delivery module according to one embodiment.

FIG. 12 is a block diagram illustrating the architecture of a fault tolerant continuous delivery module according to one embodiment. The fault tolerant continuous delivery module includes a datacenter configuration module 1210, a continuous delivery request router 1220, and a control datacenter metadata store 1230. Other embodiments may include more or fewer modules than indicated in FIG. 12. Functions performed by a particular module as indicated herein may be performed by other modules than those indicated.

In an embodiment, the fault tolerant continuous delivery module configures a primary control datacenter and a secondary control datacenter on the cloud platform. The primary control datacenter may also be referred to as an active control datacenter, or an active control plane. The secondary control datacenter may also be referred to as a standby control datacenter or a standby control plane. A control datacenter may also be referred to herein as a bootstrap datacenter, for example, an active control datacenter referred to as active bootstrap datacenter and a standby control datacenter referred to as a standby bootstrap datacenter. A control datacenter includes a minimum set of services needed to configuring other datacenter and for making changes to the configuration of datacenters, for example, to reconfigure services installed on datacenters, to configure software artifacts associated with services on datacenters and so on.

The datacenter configuration module 1210 configures one or more control datacenters on a target cloud platform. In an embodiment, the datacenter configuration module 1210 configure a primary control datacenter and a secondary control datacenter on the target cloud platform. The primary control datacenter is used for processing requests for configuring datacenters or services on datacenters and the secondary control datacenter is used instead of the primary control datacenter, for example as a standby control datacenter. The secondary control datacenter may be used instead of the primary control datacenter in case of failure of one or more services of the primary control datacenter, planned maintenance of one or more services of the primary control datacenter, data corruption of a data store of the primary control datacenter, security breach in the primary datacenter, or other reasons. The use of two control datacenters provide fault tolerance since the chances of both control datacenters failing or being unavailable at the same time are significantly lower than the chances of a single control datacenter failing or being unavailable.

The datacenter configuration module 1210 may configure the primary control datacenter on one target cloud platform and the secondary control datacenter on a different target cloud platform. This provides additional fault tolerance in case there is a failure in the cloud platform. For example, if both control datacenters are running on the same cloud platform and for any reason there is a failure in the cloud platform or the cloud platform is not reachable, both control datacenters will not be usable resulting in downtime if any services need to be configured or reconfigured. Running the two control datacenters in different cloud platforms ensures that the likelihood of both cloud platforms being unavailable is extremely small, thereby significantly reducing the chances of downtime of the continuous delivery platform. Other embodiments may include more than two control datacenters for additional fault tolerance.

The continuous delivery request router 1220 monitors requests for configuration of tenant datacenters, requests for configuration or service groups or services on tenant datacenters, and so on and sends them to a control datacenter. In an embodiment, if the primary control datacenter is functional, the continuous delivery request router 1220 keeps sending the configuration requests to the primary control datacenter. The continuous delivery request router 1220 may receive an indication that control should be transferred from the primary control datacenter to another control datacenter, for example, the secondary control datacenter. The indication may be received in case of various situations described herein, for example, failure of primary control datacenter, scheduled downtime of the primary control datacenter, and so on. If such an indication is received, the continuous delivery request router 1220 starts routing the configuration requests to the other control datacenter, for example, the secondary control datacenter. In an embodiment, the continuous delivery request router 1220 includes a domain name service (DNS) that routes the requests.

The control datacenter metadata store 1230 store metadata for configuring any control datacenters, for example, the primary control datacenter and the secondary control datacenter. The metadata describing a control center may be received using a declarative specification, for example, a declarative specification shown in FIG. 4 that includes a specific set of service groups or service instances as further described herein. The datacenter configuration module 1210 invokes the software release management module to generate cloud platform specific detailed pipelines 255 for configuring the control datacenters and sends the cloud platform specific detailed pipelines 255 for execution to create or configure the control datacenters on the target cloud platforms.

Figure 13:
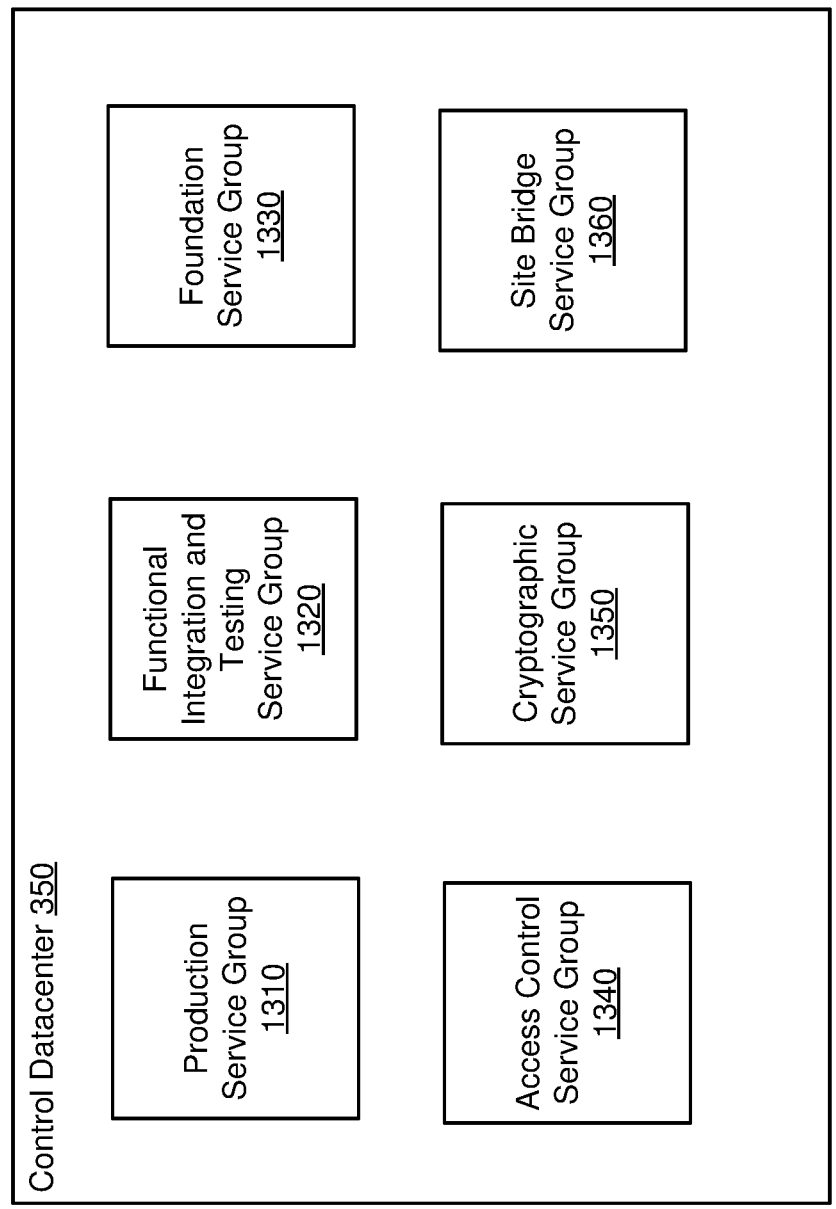
FIG. 13 is a block diagram illustrating the architecture of a control datacenter according to one embodiment.

FIG. 13 is a block diagram illustrating the architecture of a control datacenter according to one embodiment. A control datacenter includes a set of service groups as shown in FIG. 13. These service groups are needed for performing configuring datacenters in the cloud platform and performing continuous delivery of software artifacts on the datacenters. According to an embodiment, a control datacenter includes services groups including a production service group 1310, a functional integration and testing service group 1320, a foundation service group 1330, an access control service group 1340, a cryptographic service group 1350, and a site bridge service group 1360. Other embodiments may include more or fewer service groups. The service groups of a control datacenter are defined using metadata stored in the control datacenter metadata store 1230 and are specified using declarative specification for the control datacenter.

The production service group 1310 provides services needed for deploying software artifacts including pipeline generation, pipeline execution, and so on. The functional integration and testing service group 1320 provides services for executing functional testing and integration testing of software artifacts to determine whether a software artifact can be promoted from one environment to another environment. The foundation service group 1330 includes foundational services such as network time protocols (NTP), domain name systems (DNS), and other core infrastructure services. The access control service group 1340 manages passwords and credentials and manages user access to computing resources. The cryptographic service group 1350 manages encryption of data in transit and when stored. The site bridge service group 1360 provides connectivity between an organizations network (for example, an organization that is a tenant of a multi-tenant system) and computing systems acting as end points in the cloud platform. Accordingly, a control datacenter includes the services needed for performing continuous delivery. Computing systems access the control datacenter to configure datacenters in the cloud platform and to deploy software artifacts in datacenters deployed in the cloud platform.

Control datacenter satisfy certain properties, for example: different control datacenters are typically kept in different regions to ensure that if there is failure in a region thereby making a control datacenter as in-operational, other control datacenters are not affected; there are no dependencies between control datacenters, each control datacenter is autonomous; each control datacenter is self-contained (includes service groups including security service groups, access control service groups, database service groups, and so on; any account/resource information is already included in each one for the peer control datacenters (precluding the need for dynamic state transfer).

A control datacenter is used by all systems of an organization or a multi-tenant system for continuous delivery and may be a point of failure since a failure of the control datacenter affects all entities using the control datacenter for continuous delivery. Therefore, embodiments use a fault tolerant architecture as shown in FIGS. 14A-B.

Figure 14A:
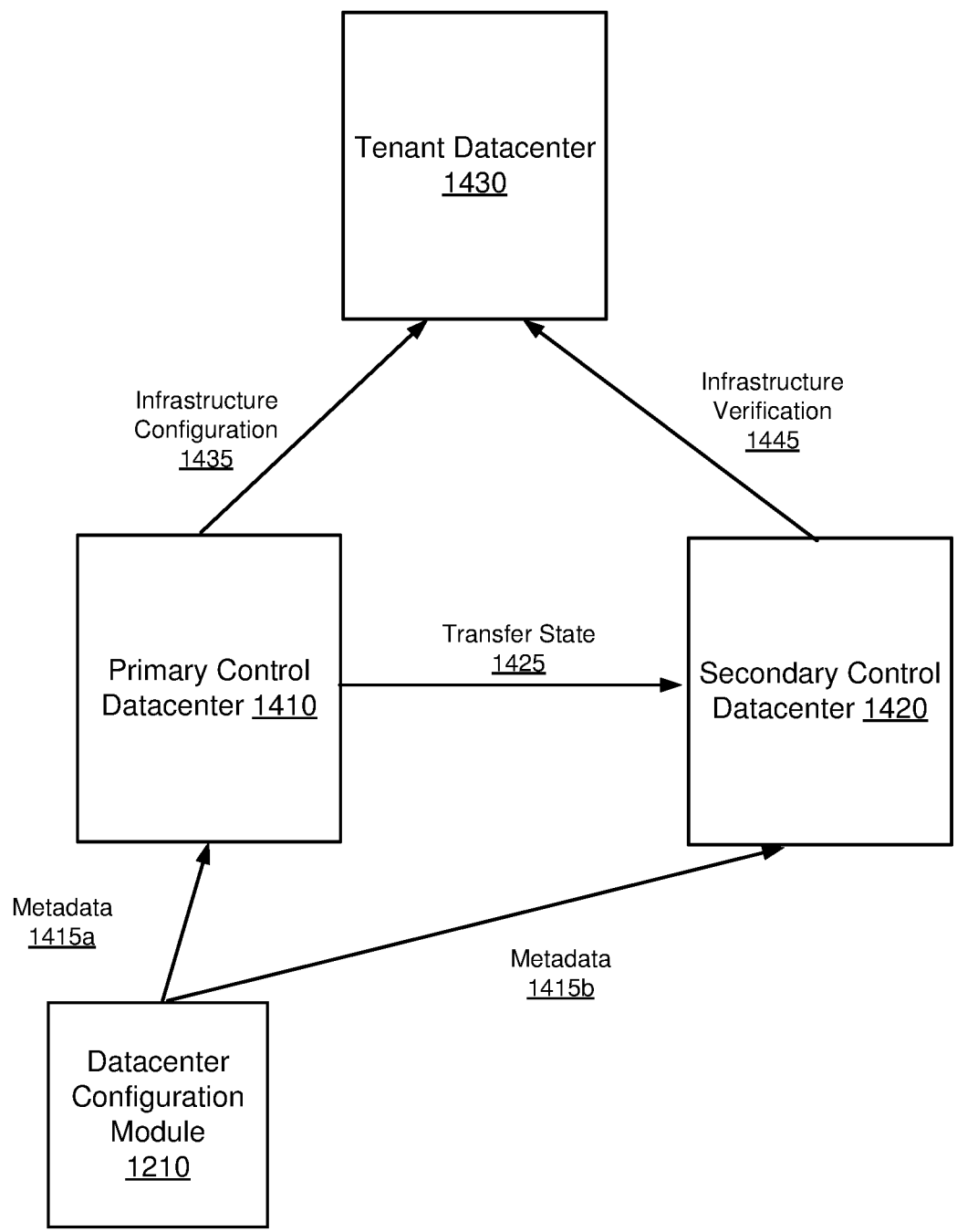
FIG. 14A-B illustrate the architecture of a fault tolerant architecture of control datacenters for continuous delivery of software artifacts to datacenters configured in a cloud platform according to one embodiment.
Figure 14B:
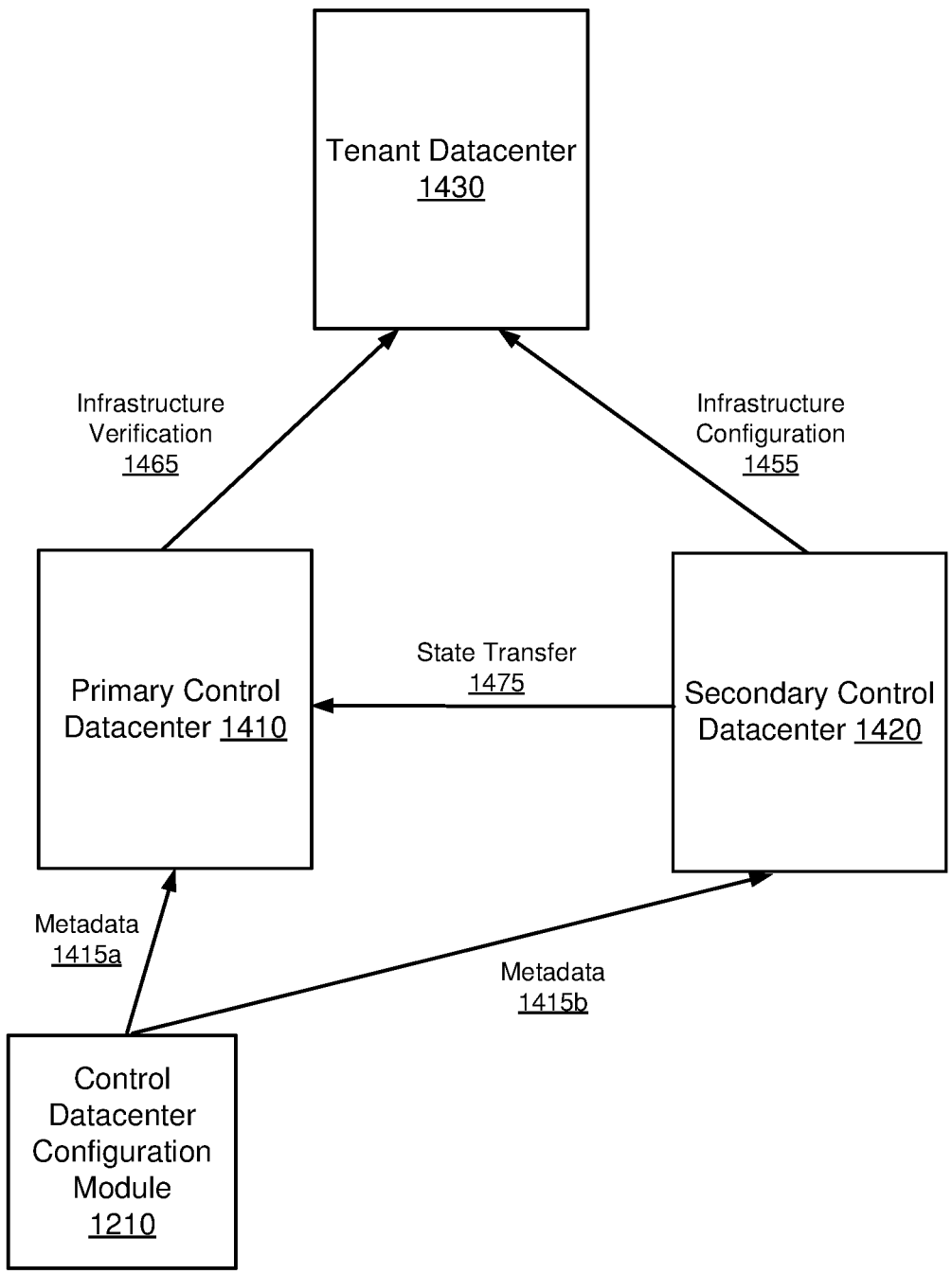

FIG. 14A-B illustrate the architecture of a fault tolerant architecture of control datacenters for continuous delivery of software artifacts for datacenters configured in a cloud platform according to one embodiment. Both FIGS. 14A-B show a primary control datacenter 1410, a secondary control datacenter 1420, and a tenant datacenter 1430. The primary control datacenter 1410 and the secondary control datacenter 1420 may be in two separate geographical regions, for example, two different states. This ensures that any disaster that may affect one control center is unlikely to affect the other control datacenter.

The datacenter configuration module 1210 sends 1415 metadata describing the tenant datacenter to the primary control datacenter 1410 and the secondary control datacenter 1420. The primary control datacenter 1410 generates pipelines for configuring the tenant datacenter based on the received 1415 metadata.

As shown in FIG. 14A, the primary control datacenter 1410 has control of the process of configuration of the tenant datacenter 1430. Accordingly, the primary control datacenter 1410 executes the pipelines generated and performs infrastructure configuration 1435 of the tenant datacenter 1430. For example, the primary control datacenter 1410 may create user accounts for access by various teams defined in the declarative specification of the tenant datacenter and configure computing resources that can be accessed by the created user accounts in accordance with the declarative specification of the tenant datacenter such that the user accounts are able to perform any specific tasks as specified in the declarative specification. A control datacenter dynamically creates user accounts and configures infrastructure in the cloud platform as part of the continuous delivery process based on the metadata describing a tenant datacenter, metadata describing a service, metadata describing service groups, and so on. The control datacenter may delete a user account if the account is not needed according to the metadata, for example, to garbage collect older accounts that are no longer used.

According to an embodiment, the creation of a user account by the control datacenter comprises the following steps. The control datacenter accesses the declarative specification for a tenant datacenter. The declarative specification may be stored as metadata describing the tenant datacenter. The control datacenter processes service definitions in the declarative specification of the tenant datacenter. For example, if new service definitions are identified in the declarative specification of the tenant datacenter, the control datacenter determines the user accounts necessary for configuring the new service and creates the new user accounts. The user account may be required to access a computing resource, for example, a database, a networking resource, a file system, a processing resource, a load balancer, a Kubernetes cluster, and so on. The control datacenter configures the associated computing resources of the cloud platform of the tenant datacenter to provide the requested functionality for the user account. For example, if the service needs database access, the control datacenter may create a user account in a database and configure one or more table spaces in the database to allow the new user account to store data in the database. The control datacenter executes any generated pipelines to deploy the service and configure and manage the service and associated infrastructure on the tenant datacenter.

The user accounts created are registered in the primary control datacenter. Registering the user accounts comprises storing them in a data store from where the primary control datacenter can access the user account information and use them for tasks related to continuous delivery of software artifacts for tenant datacenters. The registration of a user account provides information to the control datacenter to perform various actions associated with the service, for example, changing the configuration, installing software artifacts and so on. When a control datacenter receives a request associated with the service, the control datacenter accesses the user account information to identify the user accounts associated with the service and use the user accounts to perform any necessary actions such as upgrades, patches, and so on.

The primary control datacenter 1410 performs transfer 1425 of information describing the state of the configuration of the tenant datacenter 1430 to the secondary control datacenter 1420. This causes the user accounts created by the primary control datacenter to be registered in the secondary control datacenter also. For example, the primary control datacenter 1410 sends information describing each user account created in the tenant datacenter 1430 and credentials for accessing the user account to the secondary control datacenter 1420. A large organization or a multi-tenant system may create several thousands of user accounts when creating datacenters in the cloud platform.

The secondary control datacenter 1420 receives 1415*b* metadata describing the tenant datacenter from the datacenter configuration module 1210. The secondary control datacenter 1420 generates pipelines for configuration of the tenant datacenter but does not execute them. The secondary control datacenter 1420 simply stores the generated pipelines and tracks the execution of the pipelines based on the state information received from the primary control datacenter 1410. The secondary control datacenter 1420 performs infrastructure verification 1445 based on the state information received. For example, the secondary control datacenter 1420 accesses each user account created by the primary control datacenter 1410 that is received via state transfer 1425 and verifies whether the user account has access to any computing resources specified by the declarative specification of the tenant datacenter and whether the appropriate computing resources have been configured in the tenant datacenter.

FIG. 14B shows a configuration in which the secondary control datacenter has taken control of executing the process of configuration of the tenant datacenter 1430. Accordingly, in FIG. 14B, the secondary control datacenter 1420 is executing the pipelines and performing infrastructure configuration 1455. The secondary control datacenter 1420 is transferring 1475 state information to the primary control datacenter 1410, for example, any user accounts created, and the primary control datacenter 1410 is performing infrastructure verification 1465 to make sure the user accounts being created by the secondary control datacenter 1420 has access to the computing resources as specified by the declarative specification of the tenant datacenter 1420. Accordingly, the roles of the primary control datacenter 1410 and the secondary control datacenter 1420 are reversed in FIG. 14B compared to FIG. 14A. This change in configuration from FIG. 14A to FIG. 14B may have occurred due to some failure of the primary control datacenter 1410. The secondary control datacenter 1420 may wait for the failure of the primary control datacenter 1410 to be corrected before sending 1475 state information to the primary control datacenter 1410. The secondary control datacenter 1420 collects the state information for the time duration that the primary control datacenter 1410 is not available. The secondary control datacenter 1420 periodically checks whether the primary control datacenter 1410 is available, i.e., any failure is fixed (i.e., repaired) or a scheduled downtime is over. Once the primary control datacenter 1410 is available, the secondary control datacenter 1420 sends the collected state information to the primary control datacenter 1410 as a batch. After that the secondary control datacenter 1420 continues sending the state information as and when the infrastructure configuration is performed 1455 by the secondary control datacenter 1420.

Once the primary control datacenter is fully operational, the fault tolerant continuous delivery module 350 may switch the control of the overall process of configuration of the tenant datacenter to the primary control datacenter 1410 making it the active control datacenter and making the secondary control datacenter 1420 as the standby control datacenter as shown in FIG. 14A.

In an embodiment, various steps are executed to perform a switch from primary control datacenter to a secondary control datacenter. The fault tolerant continuous delivery module 350 first ensures that no new pipelines are triggered for execution in the primary control datacenter. The fault tolerant continuous delivery module 350 next sends instructions to the from primary control datacenter to complete all pipelines that are currently executing. Specifically, the fault tolerant continuous delivery module 350 identifies all pipelines that are in running state and sends instructions to complete their execution. The fault tolerant continuous delivery module 350 changes the configuration of the continuous delivery request router 1220 to start directing all requests associated with continuous delivery and configuration of datacenters in cloud platform to the secondary control datacenter instead of the primary control datacenters.

If a failure occurs in the primary control datacenter that prevents the primary datacenter from completing execution of a pipeline, the fault tolerant continuous delivery module 350 causes the entire pipeline to fail atomically. The fault tolerant continuous delivery module 350 causes the secondary control datacenter to execute all pipelines that failed to complete execution in the primary control datacenter. The operations performed during pipeline execution are idempotent. Accordingly, if an operation is executed multiple times, the effect of execution of the operation on the system is same as executing the operation once. For example, the operation of creating a user account checks whether the account is already existing and has the required access to system resources as specified in the metadata of the tenant datacenter. If the account already exists and has the required access, the control datacenter does not take any further action. If the account does not exist, the control datacenter creates the account. Similarly, if the system performs an action to configure a service, the system checks if the configuration was previously performed. If the configuration was previously performed, the control datacenter skips the remaining steps. If the configuration was not previously performed, the control datacenter executes the steps for performing the configuration.

Process for Fault Tolerant Continuous Delivery

Figure 15:
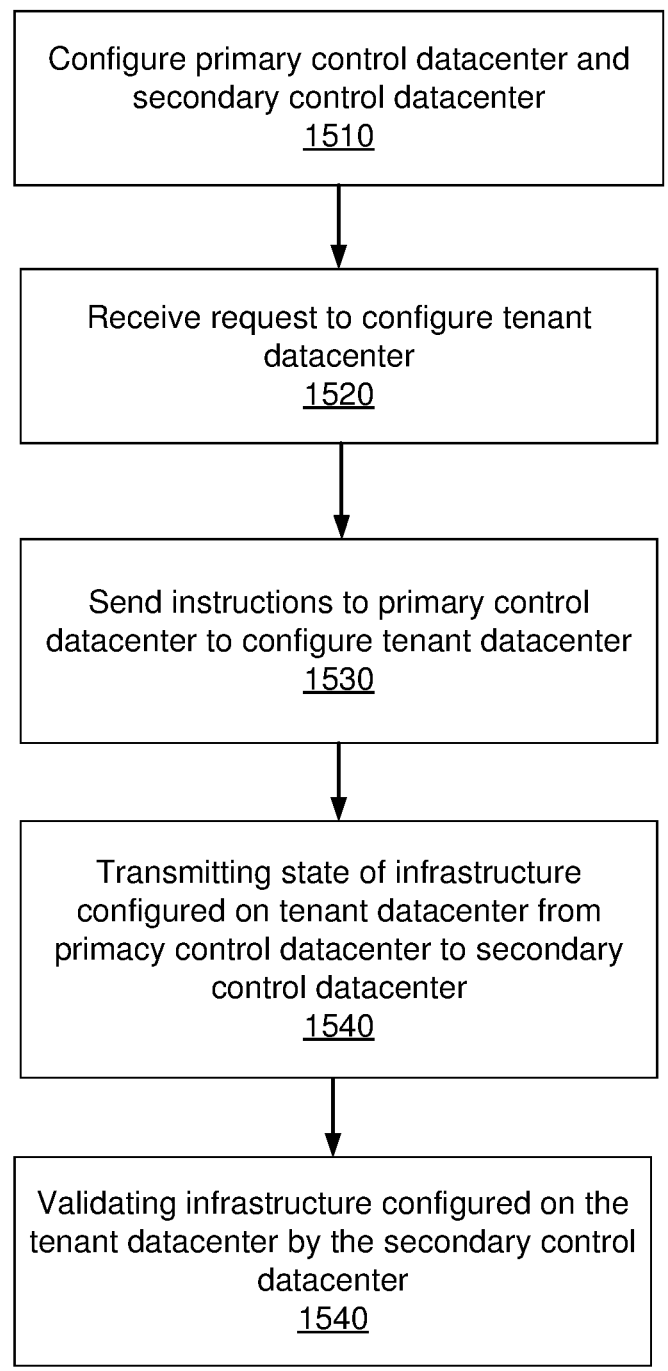
FIG. 15 shows the process for configuring a datacenter on a cloud platform using the fault tolerant architecture of control datacenters shown in FIG. 14 according to an embodiment.

FIG. 15 shows the process for configuring a datacenter on a cloud platform using the fault tolerant architecture of control datacenters shown in FIG. 14 according to an embodiment. Various steps of the process are indicated as being performed by the system. The steps may be performed by the fault tolerant continuous delivery module 350 or by other modules of the multi-tenant system, the cloud platform, or any other system. Although the process described in FIG. 15 is shown in connection with a multi-tenant system, the techniques can be applied to any online system, for example, an online system of a single organization.

The system configures 1510 the primary control datacenter 1410 and the secondary control datacenter 1420 on the cloud platform. The system accesses the declarative specifications for the primary control datacenter 1410 and the secondary control datacenter 1420 and configures them on the cloud platform. The primary control datacenter 1410 and the secondary control datacenter 1420 may be configured on two different cloud platforms using computing resources that are located on physically separate locations.

The system receives 1520 a request to configure a tenant datacenter 1430 on a cloud platform. The tenant datacenter is a datacenter associated with a tenant of a multi-tenant system.

The system sends 1530 instructions to the primary control datacenter 1410 to configure the tenant datacenter. The instructions sent to the primary control datacenter 1410 cause the primary control datacenter 1410 to perform following steps. The primary control datacenter 1410 configures infrastructure for the tenant datacenter on the cloud platform, for example, by creating user accounts according to the declarative specification and configuring computing resources of the cloud platform for access by the user accounts in accordance with the declarative specification. The primary control datacenter 1410 periodically transmits 1540 the state of the infrastructure configured for the tenant datacenter to the secondary control datacenter. For example, the primary control datacenter 1410 periodically transmits information describing user accounts created and associated credentials to the secondary control datacenter 1420. In an embodiment, the primary control datacenter 1410 periodically transmits information describing user accounts by storing the credentials in a secure system, for example, a vault system and transmitting a location from where the credentials can be accessed to a target control datacenter. The target control datacenter accesses the credentials from the location received. The control data centers can configure multiple tenant datacenters deployed on the cloud platform. The control data centers may configure multiple tenant data center concurrently. A system administrator may decide the set of tenant data centers that is configured by the control data centers.

The system sends instructions to the secondary control datacenter 1420 that cause the secondary control datacenter to validate 1540 the infrastructure of the tenant datacenter configured by the primary control datacenter. For example, the secondary control datacenter 1420 verifies whether the user accounts created by the primary control datacenter 1410 and transmitted 1540 to the secondary control datacenter 1420 are accessible by the secondary control datacenter and the user accounts have access to the required computing resources of the cloud platform.

Figure 16:
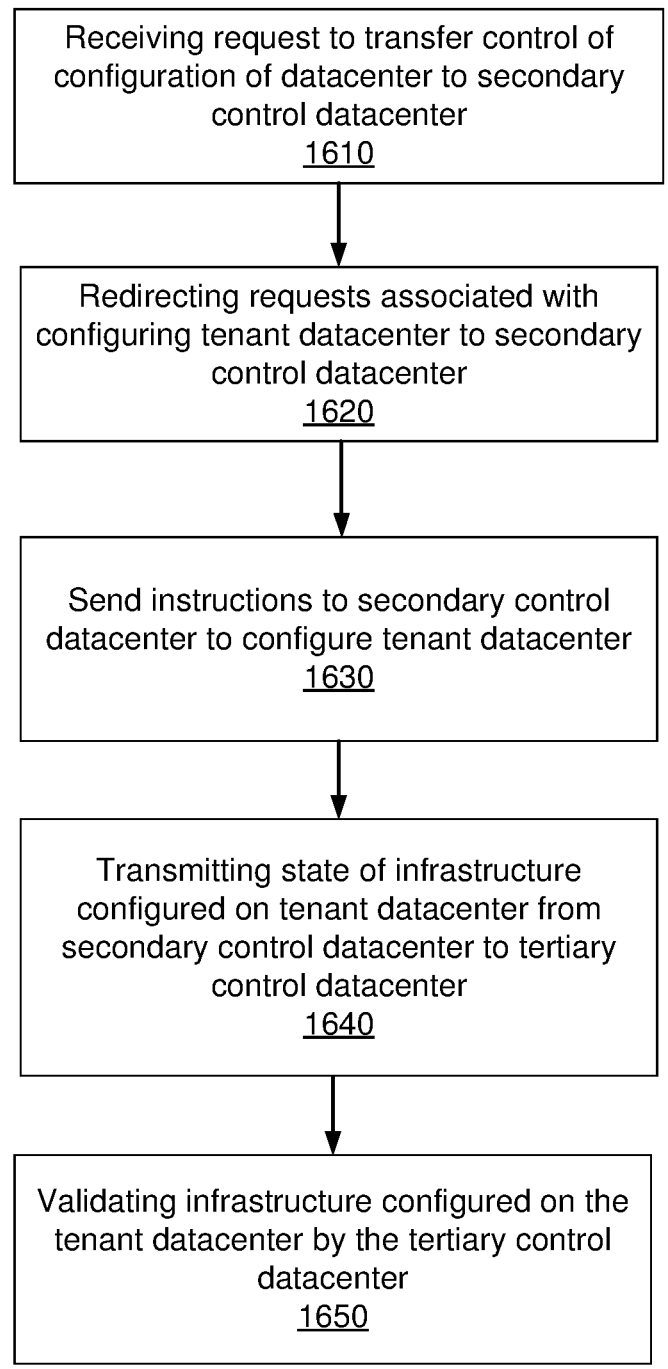
FIG. 16 shows the process for handling a failure in a primary control datacenter according to an embodiment.

FIG. 16 shows the process for handling a failure in a primary control datacenter according to an embodiment. Various steps of the process are indicated as being performed by the system. The steps may be performed by the fault tolerant continuous delivery module 350 or by other modules of the multi-tenant system, the cloud platform, or any other system.

The system receives 1610 a request to transfer control of configuration of the tenant datacenter on the cloud platform from the primary control datacenter to the secondary control datacenter. Responsive to receiving the request to transfer control, the system directs 1620 requests associated with configuration of the tenant datacenter to the secondary control datacenter instead of the primary control datacenter.

The system sends 1630 instructions to the secondary control datacenter 1420 to take over the process of configuration of the tenant datacenter. Accordingly, the secondary control datacenter 1420 performs the configuration of the tenant datacenter, for example, by creating user accounts and configuring computing resources of the cloud platform according to the declarative specification of the tenant datacenter. The secondary control datacenter 1420 transmits 1640 the state of configuration of the tenant datacenter to the primary control datacenter 1410 (or the tertiary control datacenter 1730). The primary control datacenter 1410 (or the tertiary control datacenter 1730) configured as the standby control datacenter validates 1640 the infrastructure configured on the tenant datacenter by the secondary control datacenter 1420 to ensure that the user accounts created have the required access to the computing resources of the cloud platform according to the declarative specification of the tenant datacenter. The standby control datacenter performs validation periodically as it receives information describing the infrastructure. Accordingly, the validation 1640 may be a continuous ongoing activity performed by a standby control datacenter.

The transfer of state of configuration of one control datacenter D1 to the other control datacenter D2 makes the process of transferring control from the control datacenter D1 to the other control datacenter D2 efficient since the other control datacenter D2 does not have to repeat the processing already performed by the control datacenter D1. The other control datacenter D2 can resume the configuration process from where the first control datacenter stopped the process.

High Availability Architecture for Continuous Delivery

The architecture disclosed in FIG. 14 uses a primary control datacenter and a secondary control datacenter. One of the primary or secondary control datacenter acts as an active control datacenter and the other control datacenter acts as a standby control datacenter. An active control datacenter configures cloud infrastructure on tenant datacenters. Accordingly, an active control datacenter receives requests and instructions to configure infrastructure on a tenant datacenter for performing continuous delivery for the tenant datacenter and processes the requests and instructions. The active control datacenter periodically transmits the current state of infrastructure of the tenant datacenter being configured to a standby control datacenter. The standby control datacenter is configured to receive the current state of infrastructure of the tenant datacenter from the active control datacenter and validate the current state of infrastructure of the tenant datacenter.

The standby control datacenter takes over the role of an active control datacenter if there is interruption of service of the current active control datacenter for any reason. The interruption of service of the active control datacenter may be associated with one or more components of the active control datacenter. The interruption of service of the active control datacenter maybe caused by one or more of the following reasons: (1) failure of a service of the active control datacenter, the failure caused by the one or more components; (2) planned maintenance of a service of the active control datacenter, the planned maintenance causing the one or more components of the active control datacenter to be updated; (3) data corruption of a data store of the active control datacenter, wherein the one or more components of the active control datacenter include the datastore; or (4) security breach in the active datacenter, wherein the one or more components of the active control datacenter handle security of the active control datacenter.

The system further uses a recovery control datacenter that is configured to fix components of a control datacenter. For example, a control datacenter may fail due to corruption of a component of the control datacenter. The recovery control datacenter interacts with the control datacenter to uninstall the failed component and install a new component with the same functionality. The recovery control datacenter may perform routine maintenance activities related to a component, for example, cleanup of files, backup of data, and so on. The recovery control datacenter may install upgrades or patches for components of a control datacenter.

Figure 17:
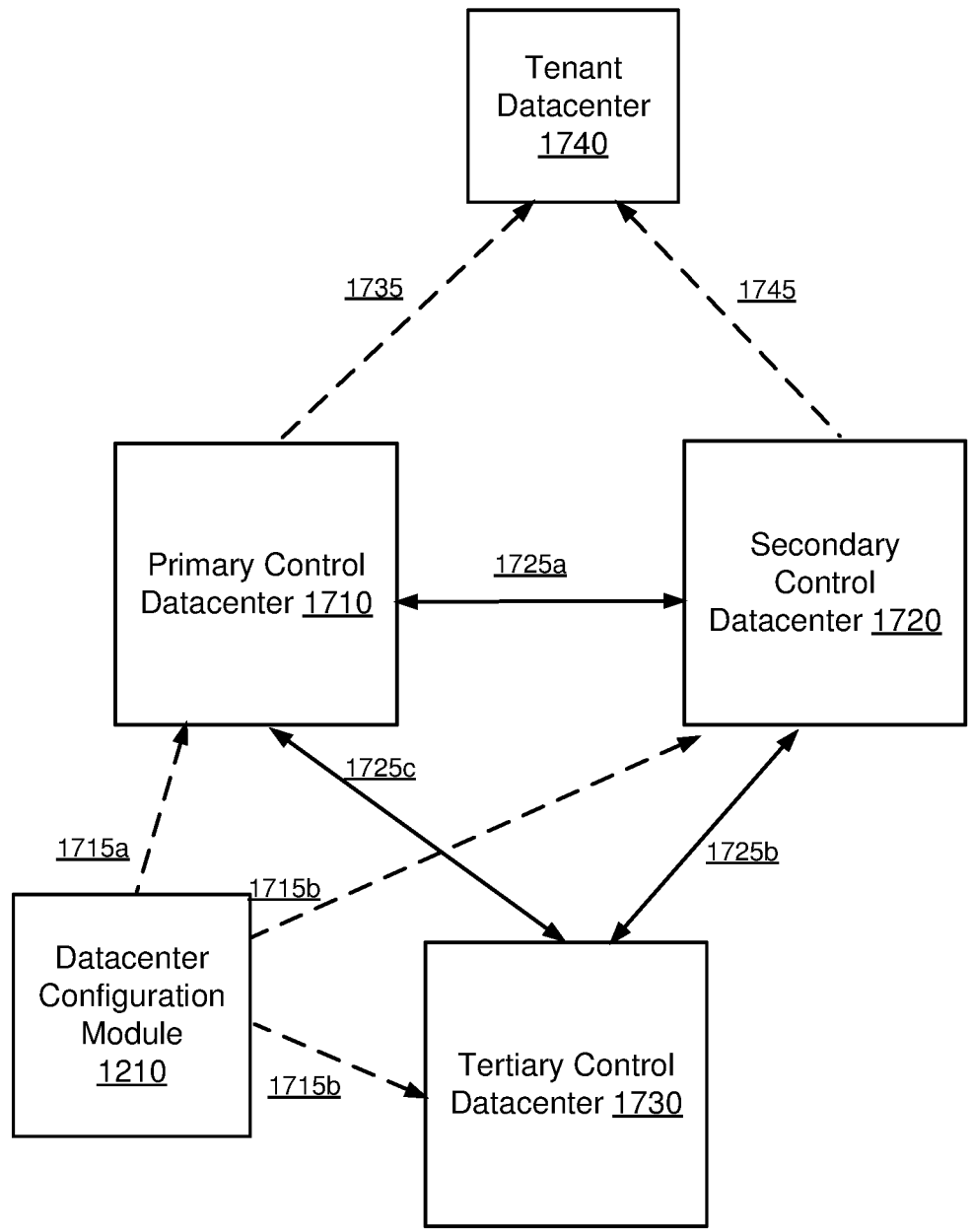
FIG. 17 illustrates the architecture of a high availability architecture of control datacenters for continuous delivery of software artifacts to datacenters configured in a cloud platform according to one embodiment.

FIG. 17 illustrates the architecture of a high availability architecture of control datacenters for continuous delivery of software artifacts to datacenters configured in a cloud platform according to one embodiment. The configuration shown in FIG. 17 aims to guarantee a system that has high availability that is close to 100% regardless of arbitrary failures. Furthermore, the system is configured to heal itself without requiring any manual intervention. The system heals itself without interrupting the continuous delivery service for any tenant datacenters.

The system disclosed in FIG. 17 includes a datacenter configuration module 1210, three control datacenters, a primary control datacenter 1710, a secondary control datacenter 1720, and a tertiary control datacenter 1730, and one or more tenant datacenter 1730 that is being configured by the control datacenters. Each of the three control datacenters shown in FIG. 17 can be configured as one or more of: an active control datacenter, a standby control datacenter, or a recovery control datacenter. Accordingly, a control datacenter could be configured as an active control datacenter, a standby control datacenter, a recovery control datacenter, or a combination, for example, standby as well as recovery control datacenter or active as well as recovery control datacenter. A control datacenter is typically not used as both an active control datacenter as well as a standby control datacenter. A control datacenter that is not functional, for example, due to failure of one or more components, due to scheduled maintenance or any other reason described for interruption of service is referred to as a broken control datacenter.

The types of functionality performed by a control datacenter is determined by the state of the control datacenter. For example, a control datacenter acting as an active control datacenter is referred to as having the active state. A control datacenter acting as a standby control datacenter is referred to as having the standby state. A control datacenter acting as a recovery control datacenter is referred to as having the recovery state. A control datacenter acting as an active control datacenter as well as a recovery control datacenter is referred to as having the state=active/recovery. A control datacenter acting as a standby control datacenter as well as a recovery control datacenter is referred to as having the state=standby/recovery. A standby control datacenter can act as an active control datacenter at any point, as long as the necessary state of the infrastructure of the tenant datacenter has been transferred from the active control datacenter to the standby control datacenter. This is so because all pipelines to manage resources are designed such that the operations executed for configuring the tenant datacenter are idempotent. So even if an operation has been performed by the active control datacenter, the standby control datacenter can repeat the operation and the end result of the tenant datacenter configuration is same (irrespective of the number of times the configuration operation is performed).

The data configuration module 1210 configures the primary control datacenter 1710, the secondary control datacenter 1720, and the tertiary control datacenter 1730. The datacenter configuration module 1210 may configure the primary control datacenter 1710, the secondary control datacenter 1720, and the tertiary control datacenter 1730 on two or more distinct cloud platforms. For example, the datacenter configuration module 1210 may configure each of the primary control datacenter 1710, the secondary control datacenter 1720, and the tertiary control datacenter 1730 on a different target cloud platform such that that control datacenters are located on physically separate locations, thereby reducing the possibility of simultaneous failures occurring on more than one control data centers at the same time, for example, due to natural disasters. Furthermore, two control datacenters do not share any resources so that failure in one control datacenter does not affect another control datacenter in a cascading manner.

The datacenter configuration module 1210 sends 1415 metadata describing the tenant datacenter 1740 to the primary control datacenter 1410, the secondary control datacenter 1420, and the tertiary control datacenter. The control datacenter that is currently acting as the active control datacenter generates pipelines for configuring the tenant datacenter based on the received metadata. The actions performed by an active control datacenter correspond to those described in connection with FIG. 14. For example, the active control datacenter has control of the process of configuration of the tenant datacenter and executes the pipelines generated and performs infrastructure configuration of the tenant datacenter 1740.

FIG. 18 shows the process for handling a failure in a primary control datacenter by the high availability architecture of FIG. 17 according to an embodiment. The process described in FIG. 18 may be performed by the data configuration module 1210 or my other modules including modules executed by computing systems of the multi-tenant system or software modules of the cloud platform. The set of modules that perform the steps of the process shown in FIG. 18 are referred to as the system.

FIGS. 19A-E illustrate various configurations of the high availability architecture of control datacenters according to various embodiments. FIG. 19 is used to illustrate the various configurations reached by the process illustrated in FIG. 18.

The system receives 1810 a request to configure a tenant datacenter of a cloud platform. The request may be to perform steps related to continuous delivery of software artifacts used by the tenant datacenter, for example, installing new software modules, upgrading software modules, and so on. The request may be to perform operations related to configuring or reconfiguring computing resources of the tenant datacenter.

Figure 19A:
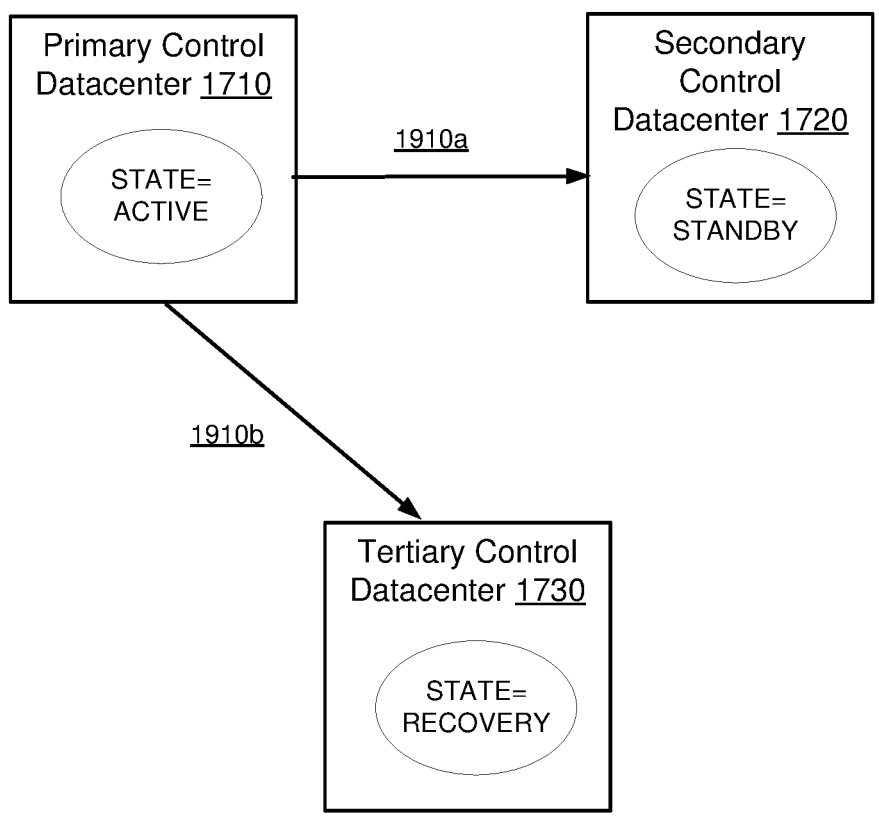
FIGS. 19A-E illustrate various configurations of the high availability architecture of control datacenters according to various embodiments.

The system configures 1820 (1) the primary control datacenter to act as active control datacenter (2) the secondary control datacenter to act as standby control datacenter and (3) the tertiary control datacenter to act as recovery control datacenter. Accordingly, the (1) the primary control datacenter has active state (2) the secondary control datacenter has standby state and (3) the tertiary control datacenter has recovery state. This initial configuration of the control datacenters is illustrated in FIG. 19A.

In other embodiments, the different control datacenters may be configured differently to assign different states to different control datacenters, for example, the (1) the primary control datacenter may be assigned standby state (2) the secondary control datacenter assigned active state and (3) the tertiary control datacenter assigned recovery state. Initially, each control datacenter is assigned a different state.

The primary control datacenter receives requests related to continuous delivery of software artifacts or computing resources on the tenant datacenter and configures the infrastructure of the tenant datacenter. The primary control datacenter 1710 that has active state periodically transmits information describing the state of the infrastructure configured on the tenant datacenter to one or both of the secondary control datacenter 1720 and the tertiary control datacenter 1730. The state describes the accounts created so far on the tenant data center. One or both of the secondary control datacenter 1720 and the tertiary control datacenter 1730 validate the state of the infrastructure, for example, by accessing the accounts created and making sure that the accounts have access to the computing resources as specified by the declarative specification of the tenant datacenter.

The architecture of the control datacenters disclosed herein can be extended to more than 3 control datacenters, for example, if there is a large number of tenant datacenters that need to be configured.

The system receives 1830 an indication of interruption of service of the primary control datacenter that has active state. The indication of interruption of service is associated with one or more components of the primary control datacenter. For example, the one or more components may have failed causing the interruption of service. Alternatively, the interruption of service may be caused due to any of the other reasons described herein, such as planned maintenance, data corruption, security breach, and so on. The interruption of service caused the primary control datacenter to reach a broken state.

Figure 19B:
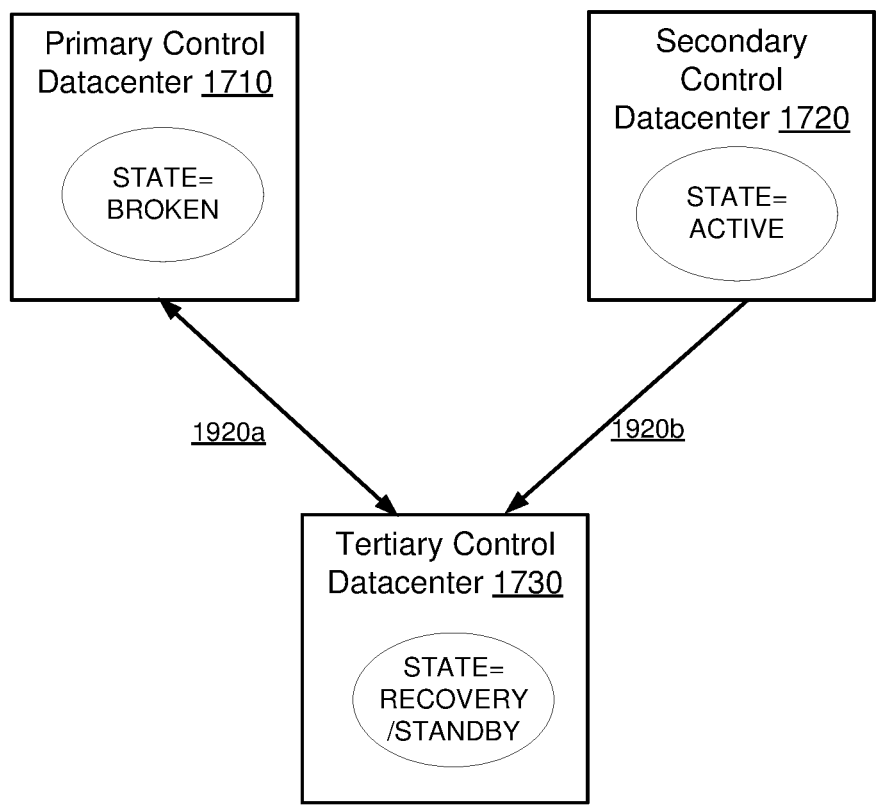

In response to the interruption of service of the primary control datacenter 1710, the system reconfigures 1840 the control datacenters such that the secondary control datacenter 1720 acts as the active control datacenter and the tertiary control datacenter 1730 acts as both the recovery control datacenters as well as the standby control datacenter. This configuration is illustrated in FIG. 19B.

The secondary control datacenter 1720 receives requests related to continuous delivery of software artifacts or computing resources on the tenant datacenter and configures the infrastructure of the tenant datacenter. The secondary control datacenter 1720 periodically transmits 1920b the current state of infrastructure of the tenant datacenter being configured to the tertiary control datacenter 1730. The tertiary control datacenter 1730 receives 1920b the current state of infrastructure of the tenant datacenter from the active control datacenter and validates the current state of infrastructure of the tenant datacenter.

The tertiary control datacenter 1730 is configured to acts as recovery datacenter, thereby fixing 1850 the components of the primary control datacenter that caused the interruption of the service of the primary control datacenter. Accordingly, the tertiary control datacenter interacts 1920a with the various components of the primary control datacenter to determine which component need to be fixed. The tertiary control datacenter may execute scripts specific to each component to determine whether the component is acting normally. The script may send ping messages to the component to check how the component responds. The script may access logs associated with the component of the primary control datacenter to determine whether the component caused certain error. The error may include an error code or message that identifies an issue, for example, data corruption, security breach, or system crash. If the interruption of service is caused by planned maintenance, the tertiary control datacenter checks the planned maintenance schedule to determine which component needs to be fixed.

Once the tertiary control datacenter 1730 identifies the components of the primary control datacenter that need to be fixed, the tertiary control datacenter 1730 fixes the components. In an embodiment, the tertiary control datacenter 1730 stores a set of rules configured to determine actions to be performed in case of specific failures. For example, if the failure is caused by corruption of a component, the action may represent reinstalling the component; if the interruption of service is caused by a periodic maintenance, the action may be upgrading a component by installing specific patches; if the failure matches a predetermine failure that is fixed in a specific patch of the component, the action is to install the patch; and so on. The actions are associated with scripts of sets of instructions for performing the actions. The actions may be performed by pipelines comprising stages, wherein the pipelines are executed by the pipeline execution engine 360.

Figure 19C:
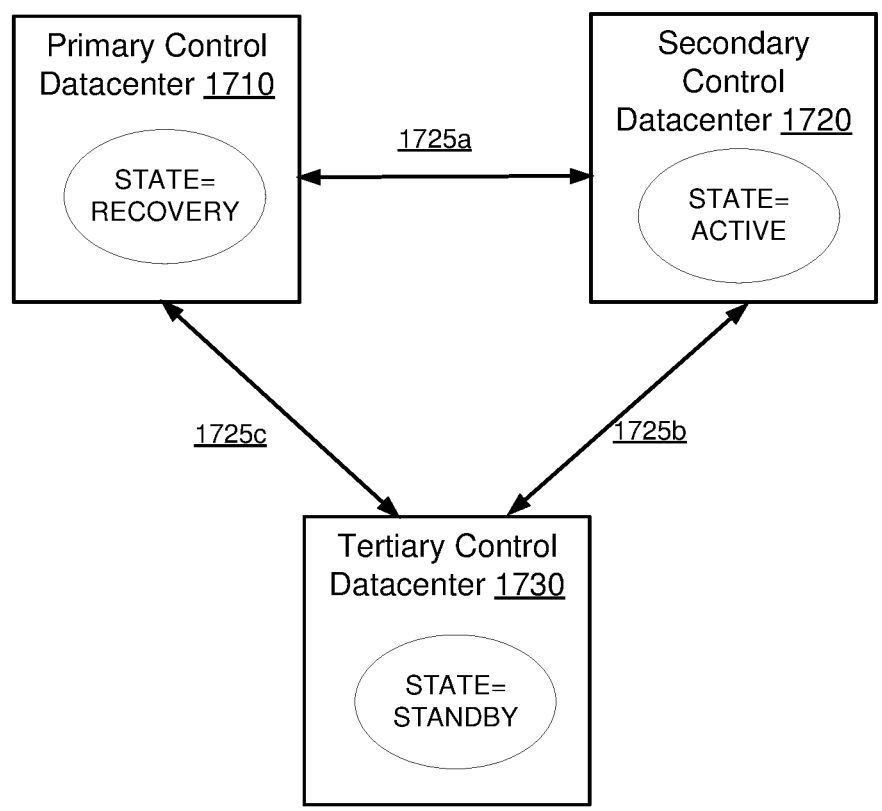

If the tertiary control datacenter completes fixing the components of the primary control datacenter, the primary control datacenter is not broken any more. The state of the primary control datacenter may be changed to either recovery or standby. As shown in FIG. 19C, the state of primary control datacenter is changed to recovery and the tertiary control datacenter is only standby control datacenter instead of being both standby and recovery. Accordingly, the secondary control datacenter continues to be active control datacenter and receives the requests related to continuous delivery of software artifacts or computing resources on the tenant datacenter and configures the infrastructure of the tenant datacenter. The secondary control datacenter periodically transmits 1920*b* the current state of infrastructure of the tenant datacenter being configured to the tertiary control datacenter. The tertiary control datacenter receives 1920*b* the current state of infrastructure of the tenant datacenter from the active control datacenter and validates the current state of infrastructure of the tenant datacenter. The primary control datacenter becomes a recovery control datacenter. In other embodiments, the tertiary control datacenter becomes recovery control datacenter and the primary control datacenter becomes standby control datacenter while the secondary control datacenter continues to be active control datacenter.

Figure 19D:
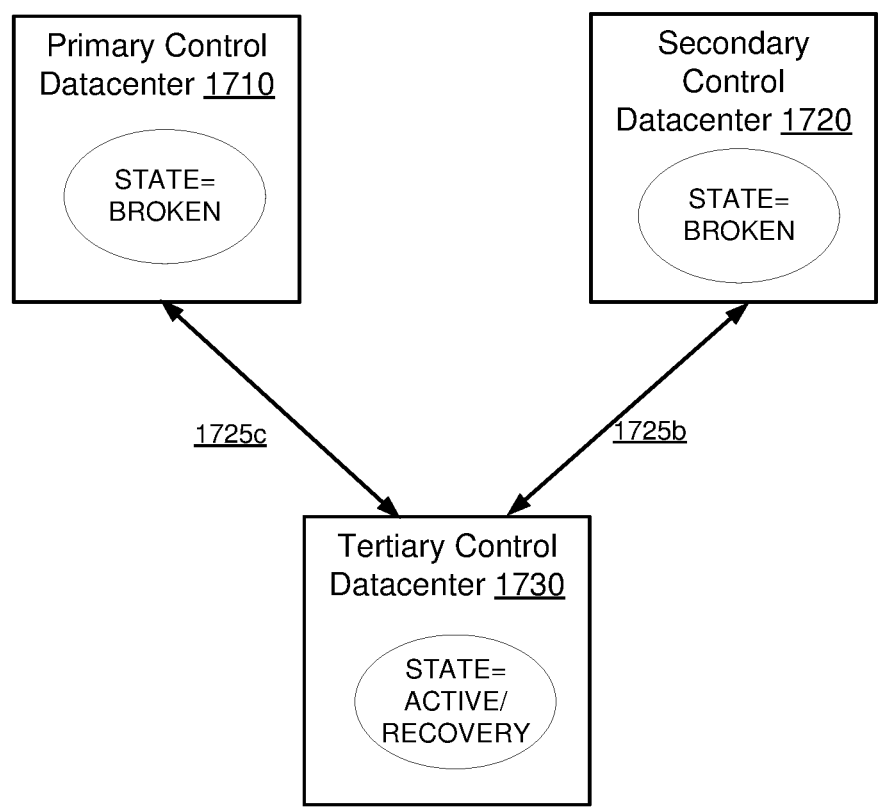

When the primary control datacenter is in a broken state as shown in FIG. 19B, it is possible that before the tertiary control datacenter is able to fix the primary control datacenter, a failure occurs in the secondary control datacenter causing the secondary control datacenter to become broken as well. This configuration is shown in FIG. 19D. In this situation, if the system was configured without a tertiary control datacenter, for example, as shown in FIG. 14, the system will stop functioning as a continuous delivery platform since both primary and secondary control datacenters are broken, thereby causing an extended interruption of continuous delivery service. However, the configuration shown in FIG. 19 is able to fix both the primary and secondary control datacenters and continue functioning. As shown in FIG. 19D, the tertiary control datacenter becomes both active control datacenter and a recovery control datacenter. In this configuration, there is no standby control datacenter. However, this situation would typically last for a short interval, while the tertiary control datacenter fixes at least one of the primary control datacenter and the secondary control datacenter. Whichever control datacenter gets fixed first is configured as the standby control datacenter. For example, if the tertiary control datacenter is able to fix the primary control datacenter first, the primary control datacenter is configured as the standby control datacenter and whenever the secondary control datacenter is fixed next, the secondary control datacenter is configured as the recovery control datacenter.

Figure 19E:
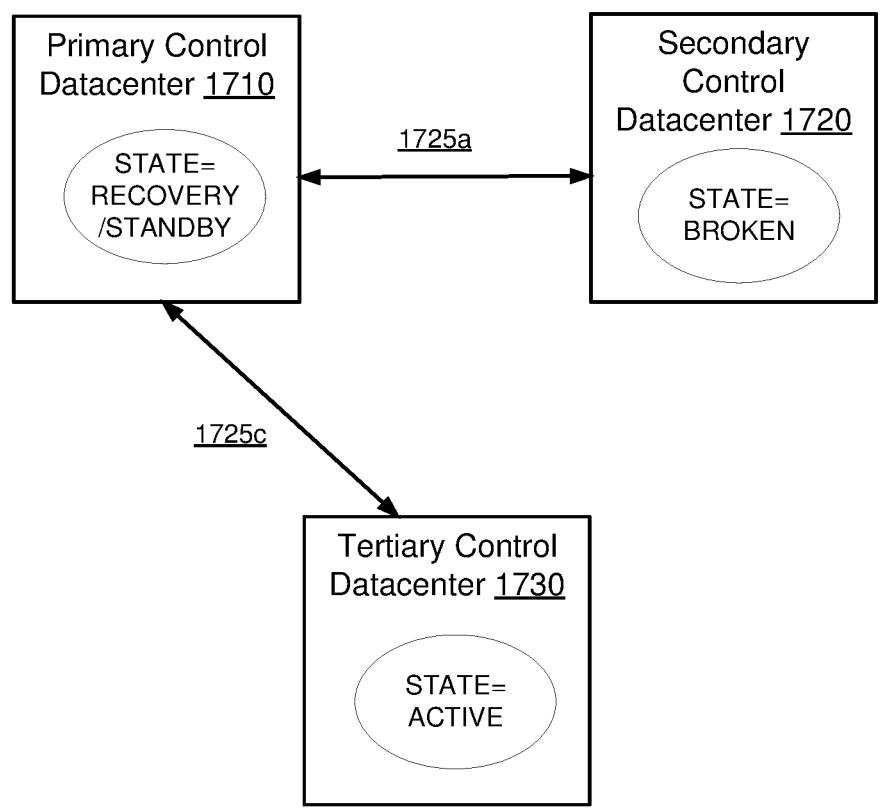

In an embodiment, the tertiary control datacenter fixes the primary control datacenter first. Once the primary control datacenter is fixed, the primary control datacenter is configured as both the standby control datacenter and the recovery control datacenter. This configuration is shown in FIG. 19E. The tertiary control datacenter continues to be the active control datacenter. The primary control datacenter fixes the secondary control datacenter. When the secondary control datacenter is fixed, the secondary control datacenter may be made the standby control datacenter and the primary control datacenter continues as the recovery control datacenter. Alternatively, the secondary control datacenter may be made the recovery control datacenter and the primary control datacenter continues as the standby control datacenter If the tertiary control datacenter is able to fix the secondary control datacenter first, the secondary control datacenter is configured as the standby control datacenter and whenever the primary control datacenter is fixed, the primary control datacenter is configured as the recovery control datacenter.

As illustrated by the various configurations shown in FIG. 19, the various control datacenters can take different roles as necessary to ensure that any broken control datacenter is fixed without disrupting the continuous delivery service for tenant datacenters.

Computer Architecture

Figure 20:
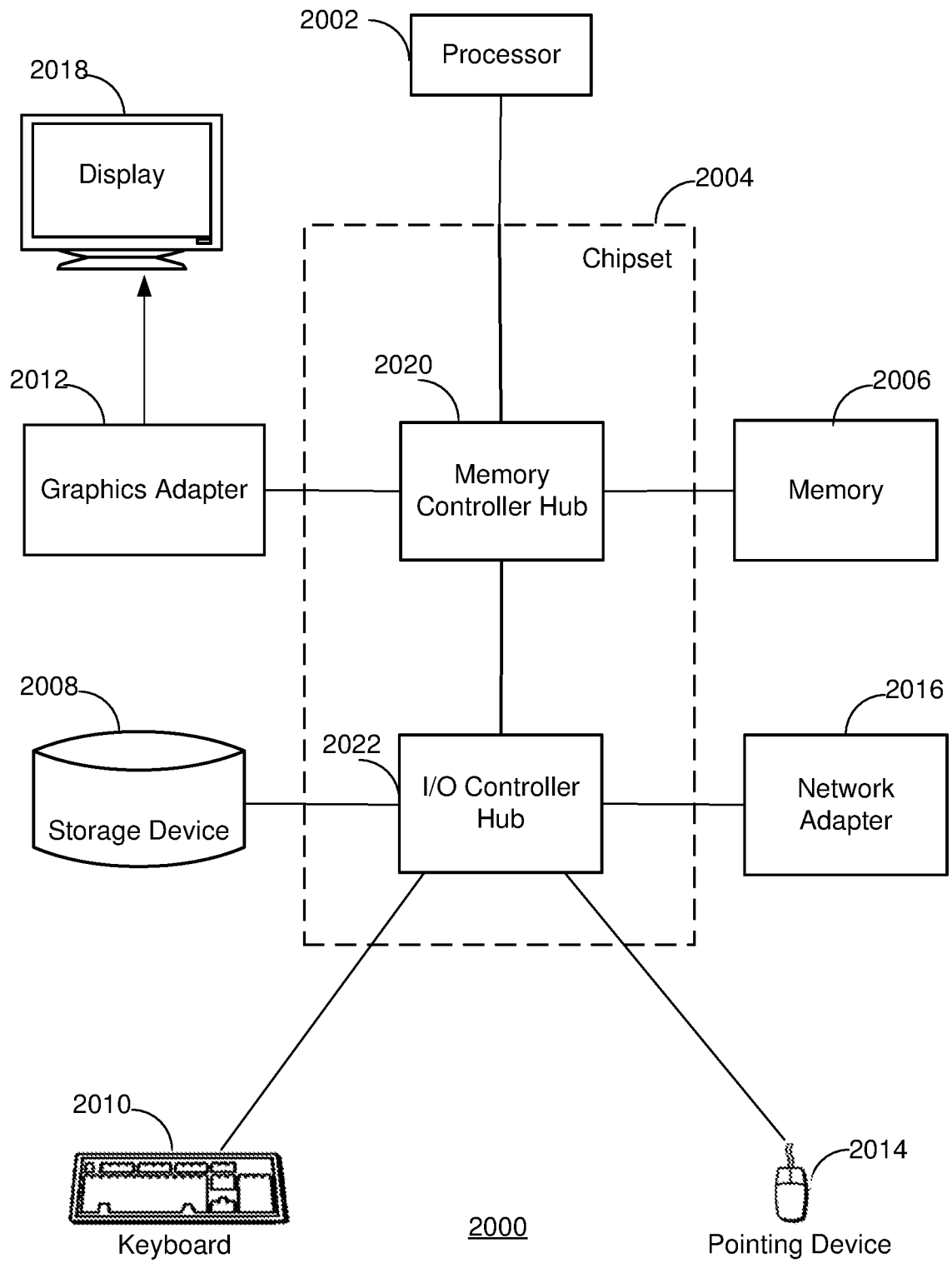
FIG. 20 is a block diagram illustrating a functional view of a typical computer system for use in the environment of FIG. 1 according to one embodiment.

FIG. 20 is a high-level block diagram illustrating a functional view of a typical computer system for use as one of the entities illustrated in the environment 100 of FIG. 1 according to an embodiment. Illustrated are at least one processor 2002 coupled to a chipset 2004. Also coupled to the chipset 2004 are a memory 2006, a storage device 2008, a keyboard 2010, a graphics adapter 2012, a pointing device 2014, and a network adapter 2016. A display 2018 is coupled to the graphics adapter 2012. In one embodiment, the functionality of the chipset 2004 is provided by a memory controller hub 2020 and an I/O controller hub 2022. In another embodiment, the memory 2006 is coupled directly to the processor 2002 instead of the chipset 2004.

The storage device 2008 is a non-transitory computer-readable storage medium, such as a hard drive, compact disk read-only memory (CD-ROM), DVD, or a solid-state memory device. The memory 2006 holds instructions and data used by the processor 2002. The pointing device 2014 may be a mouse, track ball, or other type of pointing device, and is used in combination with the keyboard 2010 to input data into the computer system 200. The graphics adapter 2012 displays images and other information on the display 2018. The network adapter 2016 couples the computer system 2000 to a network.

As is known in the art, a computer 2000 can have different and/or other components than those shown in FIG. 20. In addition, the computer 2000 can lack certain illustrated components. For example, a computer system 2000 acting as a multi-tenant system 110 may lack a keyboard 2010 and a pointing device 2014. Moreover, the storage device 2008 can be local and/or remote from the computer 2000 (such as embodied within a storage area network (SAN)).

The computer 2000 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 2008, loaded into the memory 2006, and executed by the processor 2002.

The types of computer systems 2000 used by the entities of a system environment can vary depending upon the embodiment and the processing power used by the entity. For example, a client device may be a mobile phone with limited processing power, a small display 2018, and may lack a pointing device 2014. A multi-tenant system or a cloud platform, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

What is claimed is:

1. A computer implemented method for high availability continuous delivery for a cloud platform, the method comprising:
    configuring on the cloud platform: a primary control datacenter, a secondary control datacenter, and a tertiary control datacenter;
    receiving a request to configure a particular tenant datacenter on the cloud platform;
    configuring the primary control datacenter to act as an active control datacenter, the secondary control datacenter to act as a standby control datacenter, and the tertiary control datacenter to act as a recovery control datacenter, wherein the active control datacenter executes instructions to configure an infrastructure on the particular tenant datacenter, and wherein the recovery control datacenter executes instructions for fixing components of another control datacenter;
    receiving an indication of interruption of service of the primary control datacenter caused by one or more components of the primary control datacenter;
    responsive to receiving the indication of interruption, causing the secondary control datacenter to act as the active control datacenter and the tertiary control datacenter to act as both the recovery control datacenter and the standby control datacenter; and
    executing instructions by the tertiary control datacenter to fix the one or more components of the primary control datacenter.

2. The computer implemented method of claim 1, wherein the active control datacenter periodically transmits current state of the infrastructure of the particular tenant datacenter to the standby control datacenter and the standby control datacenter receives the current state of the infrastructure of the particular tenant datacenter and validates the current state of the infrastructure of the particular tenant datacenter.

3. The computer implemented method of claim 1, wherein causing the secondary control datacenter to act as the active control datacenter and the tertiary control datacenter to act as both the recovery control datacenter and the standby control datacenter causes the request for configuring the infrastructure for the particular tenant datacenter to be directed to the secondary control datacenter, wherein the secondary control datacenter periodically transmits state of the infrastructure configured for the particular tenant datacenter to the tertiary control datacenter.

4. The computer implemented method of claim 1, further comprising:
  receiving indication of interruption of service of the secondary control datacenter caused by one or more components of the secondary control datacenter while the one or more components of the primary control datacenter are being fixed;
  responsive to receiving indication of interruption of service of the secondary control datacenter, causing the tertiary control datacenter to act as the recovery control datacenter as well as the active control datacenter, wherein the request for configuring the infrastructure for the particular tenant datacenter are directed to the tertiary control datacenter; and
  executing instructions by the tertiary control datacenter to fix the one or more components of the secondary control datacenter.

5. The computer implemented method of claim 1, further comprising:
  receiving indication of at least one control datacenter becoming operational, wherein the at least one control datacenter is one of (1) the primary control datacenter or (2) the secondary control datacenter; and
  responsive to receiving indication of at least one control datacenter becoming operational, causing the at least one control datacenter to become the active control datacenter, while the tertiary control datacenter acts as both (1) the recovery control datacenter and (2) the standby control datacenter.

6. The computer implemented method of claim 1, wherein responsive to the standby control datacenter receiving instructions to become the active control datacenter, the standby control datacenter resumes configuration of the infrastructure of the particular tenant datacenter from a current state received by the standby control datacenter from the active control datacenter.

7. The computer implemented method of claim 6, wherein resuming configuration of the infrastructure of the particular tenant datacenter from the current state causes the standby control datacenter to perform an operation that was already performed by the active control datacenter.

8. The computer implemented method of claim 1, wherein configuring the particular tenant datacenter comprises:
  receiving a cloud platform independent declarative specification for the particular tenant datacenter; and
  compiling the cloud platform independent declarative specification to generate a cloud platform specific datacenter representation.

9. The computer implemented method of claim 8, wherein configuring the infrastructure of the particular tenant datacenter comprises creating a plurality of accounts on the cloud platform, wherein an account is configured according to the cloud platform independent declarative specification of the particular tenant datacenter.

10. The computer implemented method of claim 1, wherein configuring the infrastructure of the particular tenant datacenter comprises creating one or more pipelines, wherein a pipeline comprises stages for configuring one or more datacenter entities for the particular tenant datacenter.

11. The computer implemented method of claim 1, wherein the particular tenant datacenter comprises one or more service groups, wherein each service group comprises a set of services.

12. The computer implemented method of claim 1, wherein the particular tenant datacenter comprises a hierarchy of datacenter entities, wherein a datacenter entity comprises a service or a service group, wherein each service group comprises a set of services.

13. The computer implemented method of claim 1, wherein the indication of interruption of service of the primary control datacenter is received responsive to one or more of:
  failure of a service of the primary control datacenter, the failure caused by the one or more components;
  planned maintenance of a service of the primary control datacenter, the planned maintenance causing the one or more components of the primary control datacenter to be updated;
  data corruption of a data store of the primary control datacenter, wherein the one or more components of the primary control datacenter include the data store; or
  security breach in the primary control datacenter, wherein the one or more components of the primary control datacenter, handle security of the primary control datacenter.

14. The computer implemented method of claim 1, wherein the primary control datacenter is in the cloud platform and at least one of the secondary control datacenter or the tertiary control datacenter is in another cloud platform.

15. A non-transitory computer readable storage medium for storing instructions that when executed by one or more computer processors cause the one or more computer processors to perform steps for configuring datacenters on a cloud platform, the steps comprising:
  configuring on the cloud platform: a primary control datacenter, a secondary control datacenter, and a tertiary control datacenter;
  receiving a request to configure a particular tenant datacenter on the cloud platform;
  configuring the primary control datacenter to act as an active control datacenter, the secondary control datacenter to act as a standby control datacenter, and the tertiary control datacenter to act as a recovery control datacenter, wherein the active control datacenter executes instructions to configure an infrastructure on the particular tenant datacenter, and wherein the recovery control datacenter executes instructions for fixing components of another control datacenter;
  receiving an indication of interruption of service of the primary control datacenter caused by one or more components of the primary control datacenter;
  responsive to receiving the indication of interruption, causing the secondary control datacenter to act as the active control datacenter and the tertiary control datacenter to act as both the recovery control datacenter and the standby control datacenter; and executing instructions by the tertiary control datacenter to fix the one or more components of the primary control datacenter.

16. The non-transitory computer readable storage medium of claim 15, wherein the active control datacenter periodically transmits current state of the infrastructure of the particular tenant datacenter to the standby control datacenter and the standby control datacenter receives the current state of the infrastructure of the particular tenant datacenter and validates the current state of the infrastructure of the particular tenant datacenter.

17. The non-transitory computer readable storage medium of claim 15, wherein the instructions further cause the one or more computer processors to perform steps comprising:
  receiving indication of interruption of service of the secondary control datacenter caused by one or more components of the secondary control datacenter while the one or more components of the primary control datacenter are being fixed;
  responsive to receiving indication of interruption of service of the secondary control datacenter, causing the tertiary control datacenter to act as the recovery control datacenter as well as the active control datacenter, wherein the request for configuring the infrastructure for the particular tenant datacenter are directed to the tertiary control datacenter; and
  executing instructions by the tertiary control datacenter to fix the one or more components of the secondary control datacenter.

18. The non-transitory computer readable storage medium of claim 15, wherein the instructions further cause the one or more computer processors to perform steps comprising:
  receiving indication of at least one control datacenter becoming operational, wherein the at least one control datacenter is one of (1) the primary control datacenter or (2) the secondary control datacenter; and
  responsive to receiving indication of at least one control datacenter becoming operational, causing the at least one control datacenter to become the active control datacenter, while the tertiary control datacenter acts as both (1) the recovery control datacenter and (2) the standby control datacenter.

19. The non-transitory computer readable storage medium of claim 15, wherein the indication of interruption of service of the primary control datacenter is received responsive to one or more of:
  failure of a service of the primary control datacenter, the failure caused by the one or more components;
  planned maintenance of a service of the primary control datacenter, the planned maintenance causing the one or more components of the primary control datacenter to be updated;
  data corruption of a data store of the primary control datacenter, wherein the one or more components of the primary control datacenter include the data store; or
  security breach in the primary control datacenter, wherein the one or more components of the primary control datacenter, handle security of the primary control datacenter.

20. A computing system comprising:
  one or more computer processors; and
  a non-transitory computer readable storage medium for storing instructions that when executed by the one or more computer processors cause the one or more computer processors to perform steps for configuring datacenters on a cloud platform, the steps comprising:
  configuring on the cloud platform: a primary control datacenter, a secondary control datacenter, and a tertiary control datacenter;
  receiving a request to configure a particular tenant datacenter on the cloud platform;
  configuring the primary control datacenter to act as an active control datacenter, the secondary control datacenter to act as a standby control datacenter, and the tertiary control datacenter to act as a recovery control datacenter, wherein the active control datacenter executes instructions to configure an infrastructure on the particular tenant datacenter, and wherein the recovery control datacenter executes instructions for fixing components of another control datacenter;
  receiving an indication of interruption of service of the primary control datacenter caused by one or more components of the primary control datacenter;
  responsive to receiving the indication of interruption, causing the secondary control datacenter to act as the active control datacenter and the tertiary control datacenter to act as both the recovery control datacenter and the standby control datacenter; and
  executing instructions by the tertiary control datacenter to fix the one or more components of the primary control datacenter.

* * * * *